US012585738B2

(12) United States Patent
Naito

(10) Patent No.: US 12,585,738 B2
(45) Date of Patent: Mar. 24, 2026

(54) IMAGE FORMING APPARATUS CAPABLE OF CONTROLLING DISPLAY UNIT AND IMAGE FORMING UNIT BASED ON LICENSE STATE, AND CONTROL METHOD FOR THE IMAGE FORMING APPARATUS

(71) Applicant: CANON KABUSHIKI KAISHA, Tokyo (JP)

(72) Inventor: Yosui Naito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 191 days.

(21) Appl. No.: 18/363,877

(22) Filed: Aug. 2, 2023

(65) Prior Publication Data

US 2024/0054189 A1 Feb. 15, 2024

(30) Foreign Application Priority Data

Aug. 12, 2022 (JP) ................................ 2022-128967

(51) Int. Cl.
*G06F 21/10* (2013.01)
*G06F 3/12* (2006.01)

(52) U.S. Cl.
CPC .......... *G06F 21/107* (2023.08); *G06F 3/1215* (2013.01); *G06F 3/1236* (2013.01)

(58) Field of Classification Search
CPC ..... G06F 21/107; G06F 3/1215; G06F 3/1236
See application file for complete search history.

(56) References Cited

U.S. PATENT DOCUMENTS

2005/0066072 A1* 3/2005 Nakamura ............ G06F 3/1203
710/8

2005/0231747 A1* 10/2005 Bledsoe ............. H04N 1/00973
358/1.13
2008/0209569 A1* 8/2008 Araki ...................... G06F 21/44
726/26
2013/0019316 A1* 1/2013 Kacin ................... G06F 21/105
726/26
2013/0239232 A1* 9/2013 Yoakum ................ G06F 21/121
726/29
2015/0101025 A1* 4/2015 Murata ................... G06F 21/10
726/4
2018/0203652 A1* 7/2018 Narita ................... G06F 3/1286

FOREIGN PATENT DOCUMENTS

JP 2021005005 A 1/2021

* cited by examiner

*Primary Examiner* — William R Korzuch
*Assistant Examiner* — Aditya Spiram
(74) *Attorney, Agent, or Firm* — ROSSI, KIMMS & McDOWELL LLP

(57) ABSTRACT

An image forming apparatus which is capable of, even when an operation restriction or function restriction is enforced in the image forming apparatus, making a restricted operation or function available for license authentication. A display unit and an image forming unit of the image forming apparatus are controlled based on a license state. The display unit displays a first screen on which a first network setting for setting a network for receiving image data used for image formation is carried out. While the image forming apparatus is in a predetermined license state, the use of the image forming unit and the first network setting on the first screen are prohibited. In the predetermined state, the display unit displays a second screen on which a second network setting for setting a network for license authentication, in which the use of the image forming unit is permitted, is carried out.

2 Claims, 26 Drawing Sheets

*FIG. 2*

| DEVICE SERIAL ID | LICENSE TYPE ID | LICENSE KEY |
|---|---|---|
| ABCDE-12345 | 10011 (SPEED_70) | 1234-5678-9012-3456-7890 |
| FGHIJ-67890 | 10012 (SPEED_60) | 2983-1974-9813-1823-9874 |
| AABBV-12123 | 20032 (HIGH-COMPRESSION PDF) | 0973-9879-1279-9175-1975 |
| KDKLW-29783 | 40301 (PCL) | 5917-9043-1058-8658-8810 |

Figure 13:
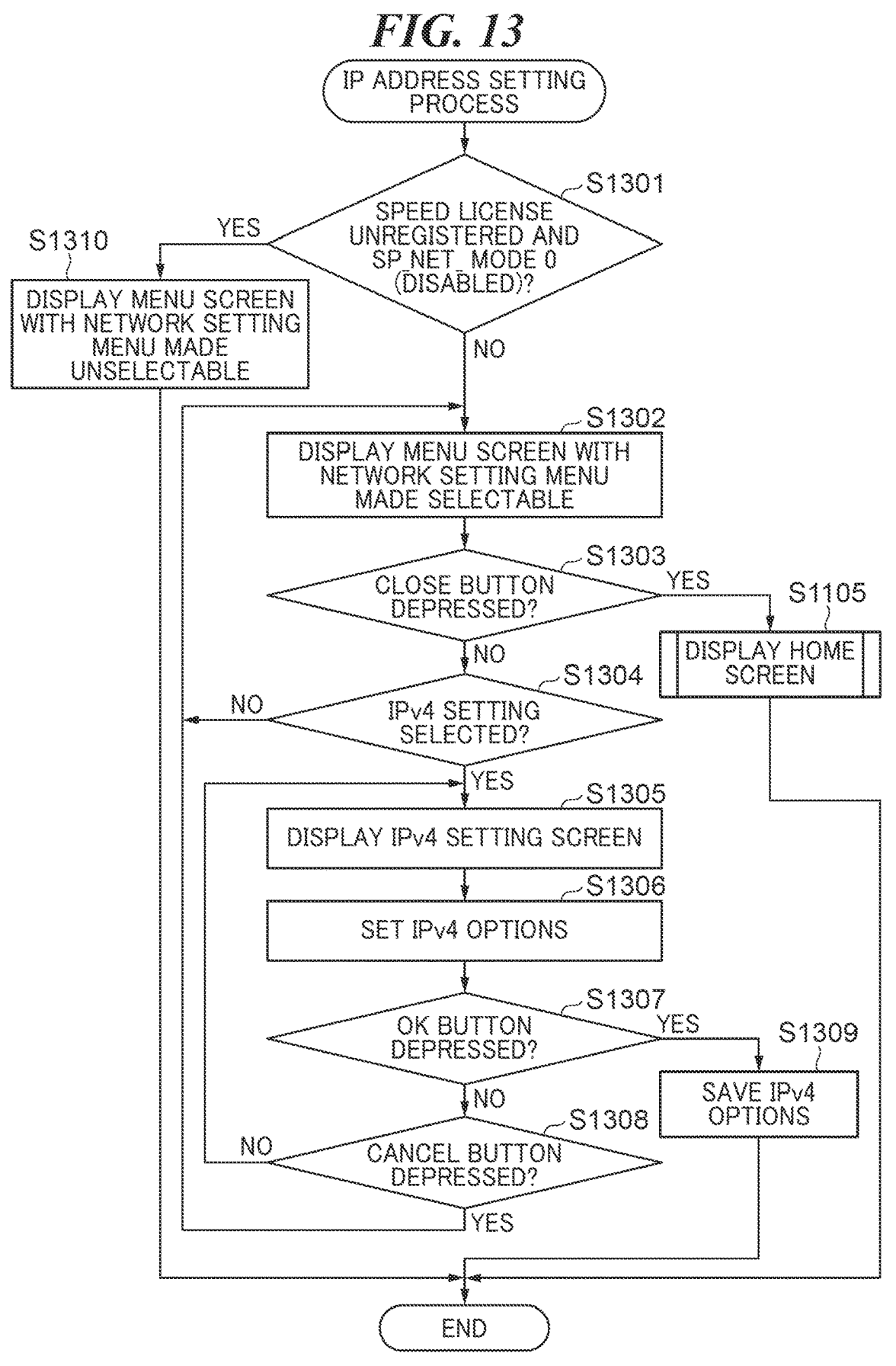

IP ADDRESS SETTING PROCESS

S1301

SPEED LICENSE UNREGISTERED AND SP_NET_MODE 0 (DISABLED)?

YES

S1310

DISPLAY MENU SCREEN WITH NETWORK SETTING MENU MADE UNSELECTABLE

NO

S1302

DISPLAY MENU SCREEN WITH NETWORK SETTING MENU MADE SELECTABLE

S1303

CLOSE BUTTON DEPRESSED?

YES

S1105

DISPLAY HOME SCREEN

NO

S1304

IPv4 SETTING SELECTED?

NO

YES

S1305

DISPLAY IPv4 SETTING SCREEN

S1306

SET IPv4 OPTIONS

S1307

OK BUTTON DEPRESSED?

YES

S1309

SAVE IPv4 OPTIONS

NO

S1308

CANCEL BUTTON DEPRESSED?

NO

YES

END 20001                    20000

20002                    20003

IMAGE FORMING APPARATUS CAPABLE OF CONTROLLING DISPLAY UNIT AND IMAGE FORMING UNIT BASED ON LICENSE STATE, AND CONTROL METHOD FOR THE IMAGE FORMING APPARATUS

BACKGROUND OF THE INVENTION

Field of the Invention

The present invention relates to image forming apparatuses, and control methods for the image forming apparatuses.

Description of the Related Art

Conventionally, there are known methods in which settings are varied with apparatuses having the same hardware configuration so as to offer a plurality of models of the apparatuses differing in operating speed to the market. For example, Japanese Laid-Open Patent Publication (Kokai) No. 2021-5005 discloses an image forming apparatus that is capable of switching its print speed from a low print speed to a high print speed on the basis of license information inputted to the image forming apparatus.

There are also image forming apparatuses configured to be set to a non-printable state, which is a state where printing is prohibited, as one of print speed states. Since prohibiting printing may affect various functions of image forming apparatuses, some image forming apparatuses are designed to, under the non-printable state, restrict user's operations related to printing so as to prevent the occurrence of unintended actions of the image forming apparatuses. For example, to prevent a user from mistakenly submitting a print job to such an image forming apparatus in the non-printable state, some image forming apparatuses may be designed so as to restrict (prevent) a network setting by a user under the non-printable state. As another example, to prevent a user from mistakenly performing an operation related to a copy function on such an image forming apparatus in the non-printable state, some image forming apparatuses may be designed so as to restrict a use of its scanning function.

However, in the image forming apparatuses having such an operation restriction or function restriction, it is feared that the flexibility in carrying out a license authentication process will be compromised. For this reason, it is preferred that the image forming apparatuses are designed such that even when an operation restriction or function restriction is being enforced in the image forming apparatuses, a restricted operation or function is made available for license authentication.

SUMMARY OF THE INVENTION

The present invention provides image forming apparatuses which are capable of, even when an operation restriction or function restriction is being enforced in the image forming apparatuses, making a restricted operation or function available for use in license authentication, and control methods for the image forming apparatuses.

According to an aspect of the invention, an image forming apparatus includes a display unit that displays a screen, an image forming unit that performs image formation on a sheet, at least one processor that controls the display unit and the image forming unit based on a license state, and a memory including instructions. The instructions cause, when executed by the at least one processor, the at least one processor to control the display unit to display a first screen on which a first network setting is carried out. The first network setting is a setting that sets up a network available for use in receiving image data for the image formation. The instructions cause, when executed by the at least one processor, the at least one processor to, while the image forming apparatus is in a predetermined license state, prohibit use of the image forming unit and prohibit the first network setting on the first screen. The instructions cause, when executed by the at least one processor, the at least one processor to control the display unit, in the predetermined license state, to display a second screen on which a second network setting is carried out. The second network setting is a setting that sets up a network available for use in license authentication in which the use of the image forming unit is permitted.

According to another aspect of the invention, an image forming apparatus includes a display unit that displays a screen, an image forming unit that performs image formation on a sheet, a document reading unit that reads a document, at least one processor that controls the display unit, the image forming unit, and the document reading unit based on a license state, and a memory including instructions. The instructions cause, when executed by the at least one processor, the at least one processor to control the display unit to display a first screen that receives a reading instruction that instructs the document reading unit to read the document. The instructions cause, when executed by the at least one processor, the at least one processor to, while the image forming apparatus is in a predetermined license state, prohibit use of the image forming unit and prohibit the first screen from receiving the reading instruction. The instructions cause, when executed by the at least one processor, the at least one processor to control the display unit, in the predetermined license state, to display a second screen for license authentication in which the document reading unit is permitted to read a document including license information that puts the image forming apparatus in a license state different from the predetermined license state and the use of the image forming unit is permitted.

According to another aspect of the invention, a method is provided for controlling an image forming apparatus that includes a display unit that displays a screen and an image forming unit that performs image formation on a sheet, and controls the display unit and the image forming unit based on a license state. The method includes controlling the display unit to display a first screen on which a first network setting is carried out. The first network setting is a setting that sets up a network available for use in receiving image data for the image formation. The method further includes, while the image forming apparatus is in a predetermined license state, prohibiting use of the image forming unit and prohibiting the first network setting on the first screen. The method further includes controlling the display unit, in the predetermined license state, to display a second screen on which a second network setting is carried out. The second network setting is a setting that sets up a network available for use in license authentication in which the use of the image forming unit is permitted.

According to another aspect of the invention, a method is for controlling an image forming apparatus that includes a display unit that displays a screen, an image forming unit that performs image formation on a sheet, and a document reading unit that reads a document, and controls the display unit, the image forming unit, and the document reading unit based on a license state. The method includes controlling the display unit to display a first screen that receives a reading instruction that instructs the document reading unit to read the document. The method further includes, while the image forming apparatus is in a predetermined license state, prohibiting use of the image forming unit and prohibiting the first screen from receiving the reading instruction. The method further includes controlling the display unit, in the predetermined license state, to display a second screen for license authentication in which the document reading unit is permitted to read a document including license information that puts the image forming apparatus in a license state different from the predetermined license state and the use of the image forming unit is permitted.

According to the present invention, even when an operation restriction or function restriction is being enforced in the image forming apparatuses, a restricted operation or function is made available for use in license authentication for the image forming apparatuses.

Further features of the present invention will become apparent from the following description of exemplary embodiments with reference to the attached drawings.

BRIEF DESCRIPTION OF THE DRAWINGS

FIG. 2 is a view illustrating an example of license data stored in a license server.

FIG. 13 is a flowchart illustrating an IP address setting process.

DESCRIPTION OF THE EMBODIMENTS

The present invention will now be described in detail below with reference to the accompanying drawings showing embodiments thereof. Arrangements of the embodiments described below, however, are examples for illustrative purposes only, and the scope of claims is not limited to the arrangements of the embodiments described below. For example, components constituting the present invention may be replaced by those with arbitrary arrangements that can achieve the same or similar functions, and any additional component may be added to the components. Any two or more arrangements (features) of the embodiments may be combined together.

First Embodiment

Figure 1:
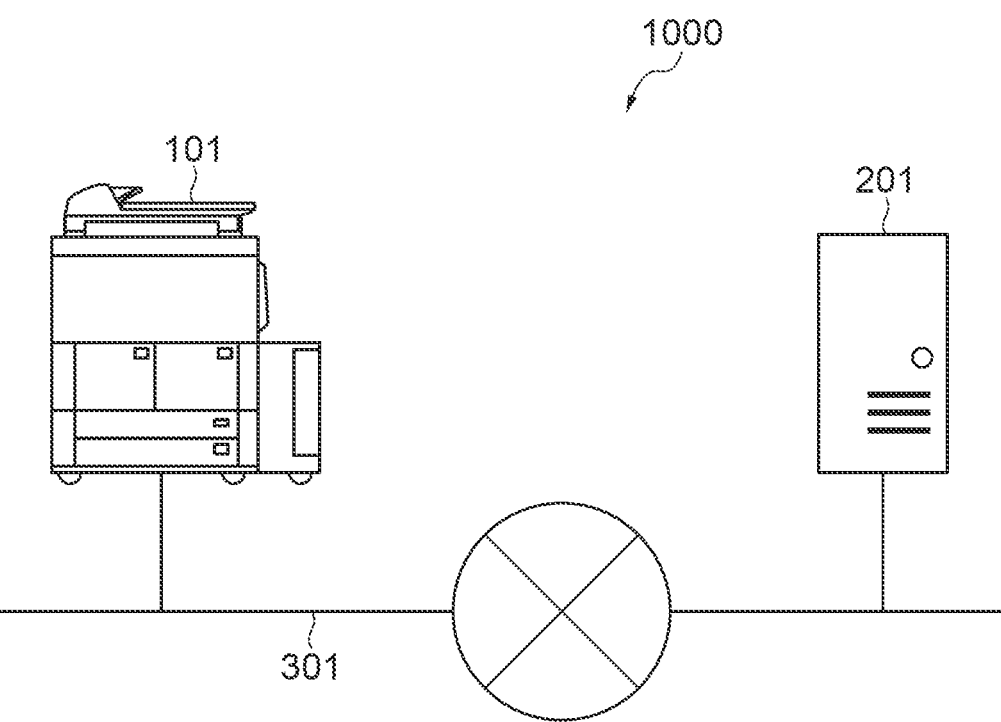
FIG. 1 is a schematic view illustrating a configuration of an image forming system according to a first embodiment.

Referring to FIG. 1 to FIG. 14, a description will now be given of a first embodiment. FIG. 1 is a schematic view illustrating a configuration of an image forming system according to a first embodiment. As illustrated in FIG. 1, the image forming system 1000 includes an image forming apparatus 101 and a license server 201, which are connected to each other via a network 301 such that they can communicate with each other.

In the present embodiment, the image forming apparatus 101, which is an apparatus configured to form images, is a multifunction peripheral (MFP). The license server 201 is an apparatus configured to grant a license to the image forming apparatus 101. When granted a license by the license server 201, the image forming apparatus 101 is allowed to operate based on a license state according to the granted license.

FIG. 2 is a view illustrating an example of license data stored in the license server 201. The license data illustrated in FIG. 2 includes sets of a device serial ID 202 of an image forming apparatus 101, a license type ID 203, and a license key 204 issued for the device serial ID 202 and the license type ID 203. When a user purchases a license from a licenser via the license server 201, information about the purchased license including the device serial ID 202, the license type ID 203, and the license key 204 is stored as data in the license server 201.

It should be noted that the present embodiment uses a license that determines a print speed of printing performed by the image forming apparatus 101. For the license, the license type ID 203 varies with print speeds. The license key 204 is uniquely issued for each pair of the license type ID 203 and the device serial ID 202. The print speed of the image forming apparatus 101 is changed based on the issued license. A printing function of the image forming apparatus 101 is deactivated until it is granted the license.

Figure 3A:
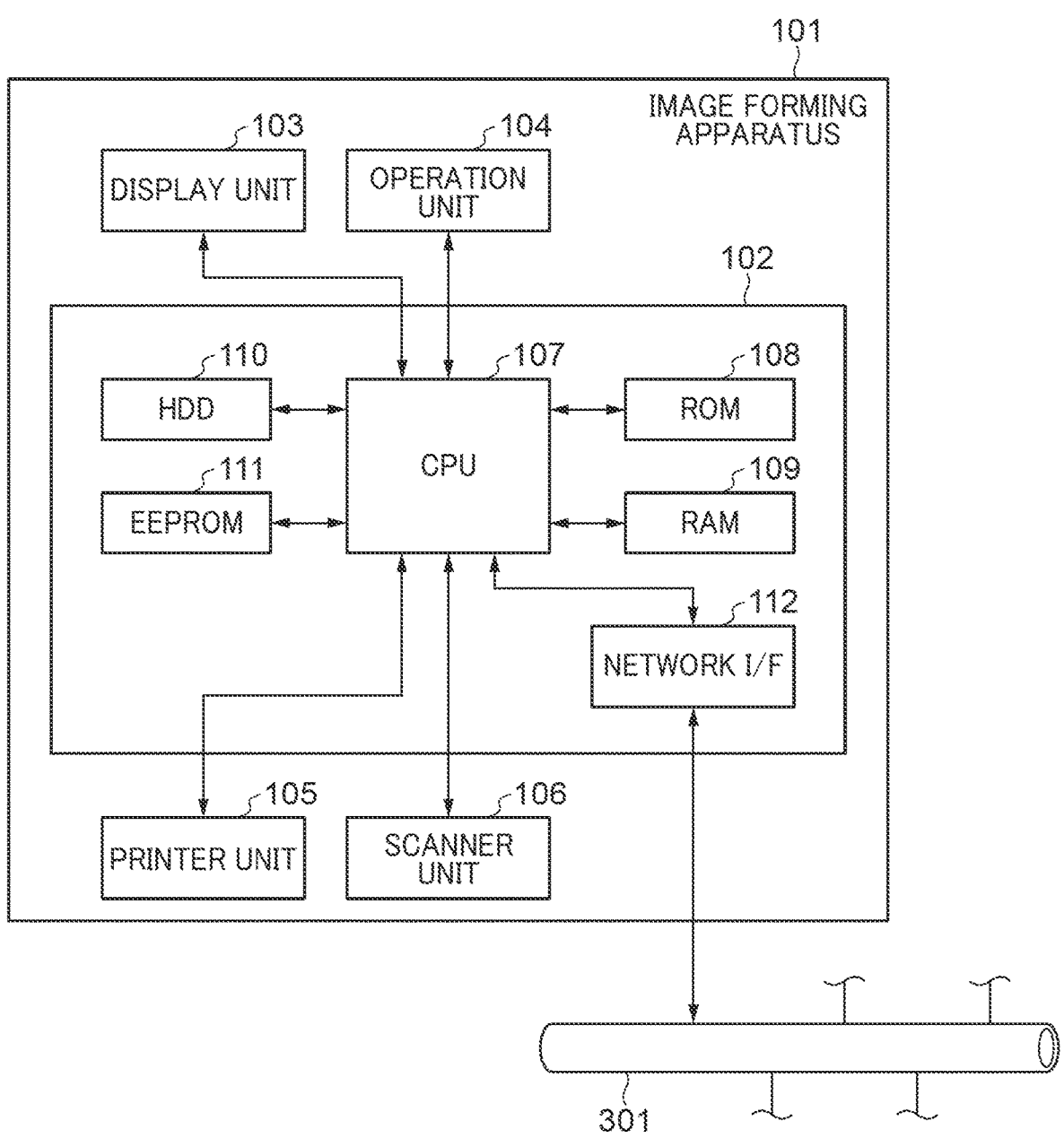
FIG. 3A is a block diagram illustrating a hardware configuration of an image forming apparatus.

FIG. 3A is a block diagram illustrating a hardware configuration of the image forming apparatus 101. As illustrated in FIG. 3, the image forming apparatus 101 includes a controller unit 102, a display unit 103, an operation unit 104, a printer unit (image forming unit) 105, and a scanner unit (document reading unit) 106.

The display unit 103 includes a display, for example, an LED or a liquid crystal display, and is configured to display screens indicating the details of operations performed by a user and/or internal information on the image forming apparatus 101. The operation unit 104 is an input device configured to receive operations from a user. The operation unit 104 may include a plurality of operating buttons, and is preferably configured as, for example, a touch-panel display in combination with the display unit 103.

The printer unit 105 is configured to receive a printing instruction from the controller unit 102 and then print image data sent from the controller unit 102 on a sheet, which results in image formation performed on the sheet. The actual print speed of the printer unit 105 is switched according to a print speed instruction which the printer unit 105 is notified of by the controller unit 102 at the startup of the printer unit 105.

The scanner unit 106 is configured to receive a reading instruction from the controller unit 102, read a document, and send image data obtained by the reading to the controller unit 102.

The controller unit 102 includes a CPU 107, a ROM 108, a RAM 109, an HDD 110, an EEPROM 111, and a network OF 112. The controller unit 102 is a controller configured to control the operation of the display unit 103, the operation unit 104, the printer unit 105, and the scanner unit 106.

The controller unit 102 functions as a display controller that causes the display unit 103 to display various screens, and functions as an operation controller that obtains information on inputs to and outputs from the operation unit 104. The controller unit 102 also functions as a printing controller that causes the printer unit 105 to perform printing, and functions as a reading controller that causes the scanner unit 106 to read a document. In particular, the controller unit 102 is capable of controlling the display unit 103, the printer unit 105, and the scanner unit 106 based on to a license state.

The CPU 107 is a computer that executes control programs stored in the image forming apparatus 101, and is configured to control the operation of devices connected to the CPU 107 via I/Fs, memory of storage media, or the like.

The ROM 108, which is a read-only memory, stores, for example, a boot program used for system startup. The RAM 109, which is a volatile memory, is a work memory used to execute control programs. The HDD 110, which is a storage medium such as a magnetic disk, stores control programs, image data, and so forth. The control programs are not particularly limited, and examples of the control programs include programs for causing the CPU 107 to operate the components of the image forming apparatus 101 (the steps of a method for controlling the image forming apparatus 101).

The EEPROM 111, which is a non-volatile memory, stores, for example, setting values used for execution of the control programs. The EEPROM 111 also holds a serial number, which identifies an individual image forming apparatus, a print speed which the printer unit 105 will be notified of, and a counter value indicating the number of pages that have been printed.

The network OF 112 is an interface configured to be connected to the network 301 and carry out network communications.

Figure 3B:
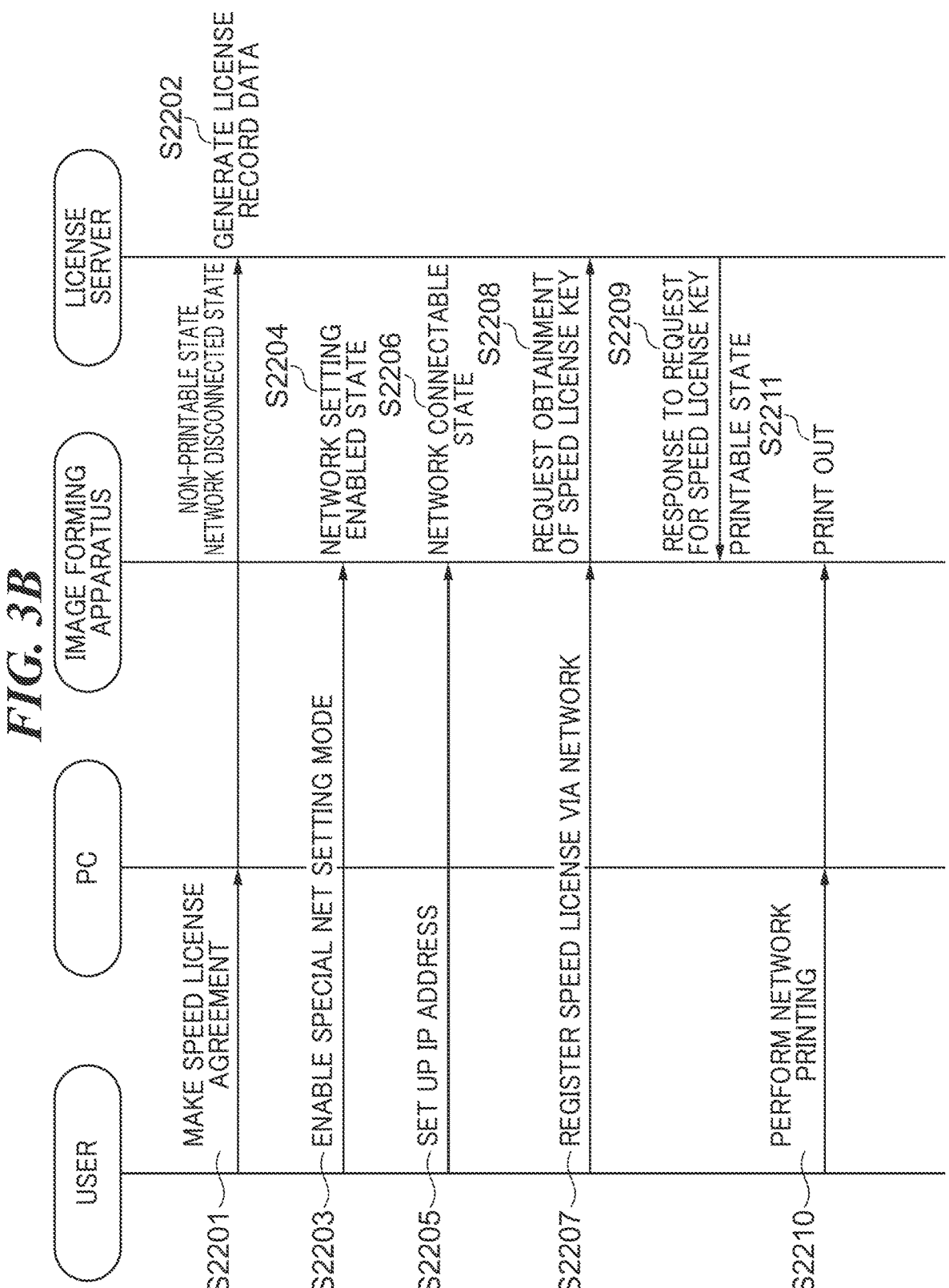
FIG. 3B is a sequence diagram illustrating how processing is performed among a user, a PC (personal computer), the image forming apparatus, and the license server.

Referring to FIG. 3B, a description will now be given of a sequence relating to how a user uses the image forming apparatus 101. FIG. 3B is a sequence diagram illustrating how processing is performed among a user, a PC (personal computer), the image forming apparatus 101, and the license server 201. This sequence begins with a speed license inactive state, which is a predetermined license state, continues with user's operations to make a license agreement for the image forming apparatus 101 and register a license on the image forming apparatus 101, and ends with printing with the image forming apparatus 101.

Here, the "speed license inactive state (speed license unregistered state)" means a state in which a license that determines the speed of image formation by the printer unit 105 of the image forming apparatus 101 has not yet been registered on the image forming apparatus 101. While the image forming apparatus 101 is in the speed license inactive state, the use (operation) of the printer unit 105 is prohibited (prohibiting step). This prohibiting step is executed by the controller unit 102. After the authentication of a speed license (license authentication) is completed, the controller unit 102 (CPU 107) controls the printer unit 105 so that is the printer unit 105 can perform image formation at a speed determined by the license. As a result, printed matter is obtained from the image forming apparatus 101.

Initially, the image forming apparatus 101 is in a non-printable state and in a network disconnected state where the image forming apparatus 101 is not connectable to a network. In step S2201, a user makes a speed license agreement with a licensor via a website or the like using the PC. After the user makes the speed license agreement, license record data including the device serial ID 202, the license type ID 203, and the license key 204 is generated on the license server 201 in step S2202.

In step S2203, to connect the image forming apparatus 101 to a network, the user enables a special NET setting mode, which will be described later, in the image forming apparatus 101. After the special NET setting mode is enabled, the image forming apparatus 101 enters a state where network setting is enabled in step S2204.

In the state where network setting is enabled, the user sets up an IP address of the image forming apparatus 101 in step S2205. As a result, in step S2206, the image forming apparatus 101 enters a network connectable state where the image forming apparatus 101 is connectable to a network.

In step S2207, the user carries out a speed license registration process, which will be described later, in the image forming apparatus 101 over the network. As a result, in step S2208, the image forming apparatus 101 is connected to the license server 201 via the network and is allowed to make a speed license key obtaining request to the license server 201. In response to the speed license key obtaining request made in the step S2208, the license server 201 sends a speed license key to the image forming apparatus 101 in the step S2209. As a result, the speed license key is registered on the image forming apparatus 101, and the image forming apparatus 101 enters a printable state where printing is permitted.

Then, in step S2210, the user uses the PC to instruct the image forming apparatus 101 to perform network printing. As a result, in step S2211, the image forming apparatus 101 produces a printout (performs printing).

Screen Display (Menu Screen Display) in the Speed License Unregistered State

Figure 4:
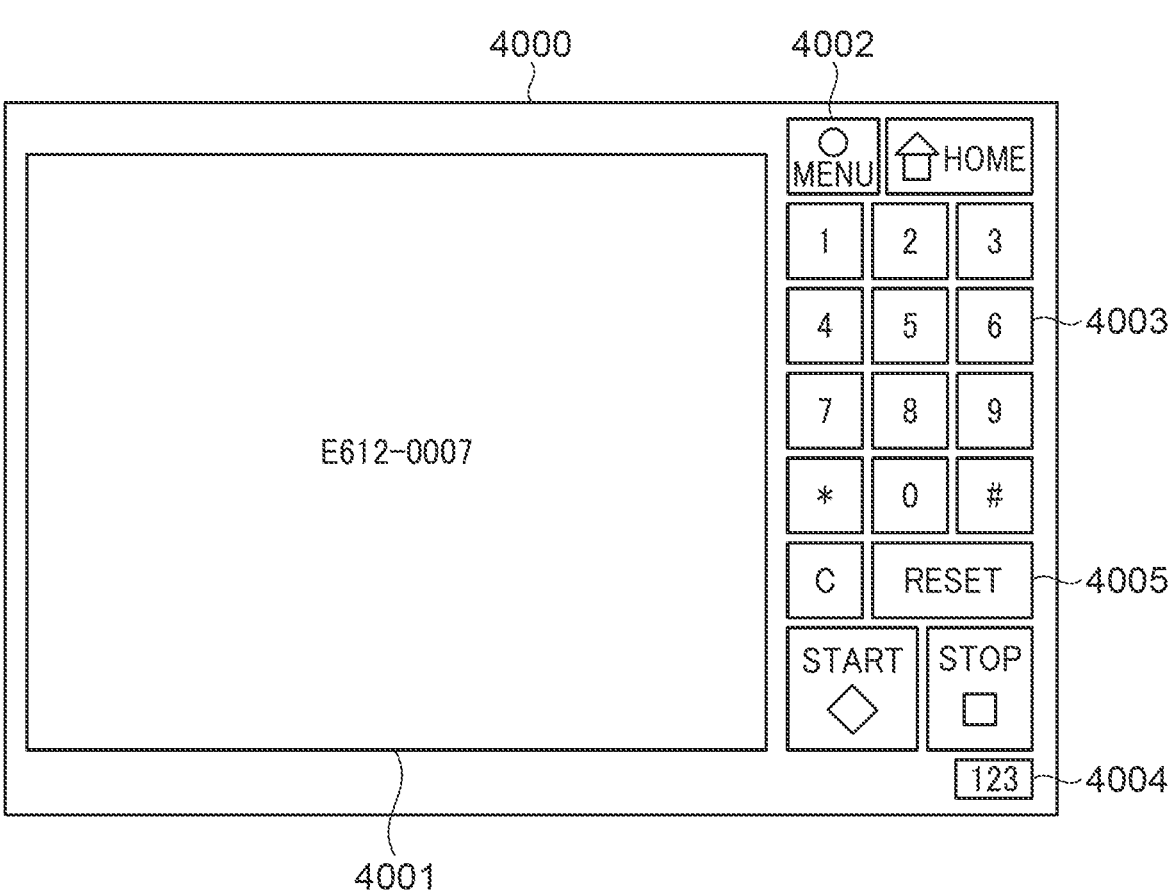
FIG. 4 is a view illustrating an example of a home screen on which an E-code is indicated.
Figure 7A:
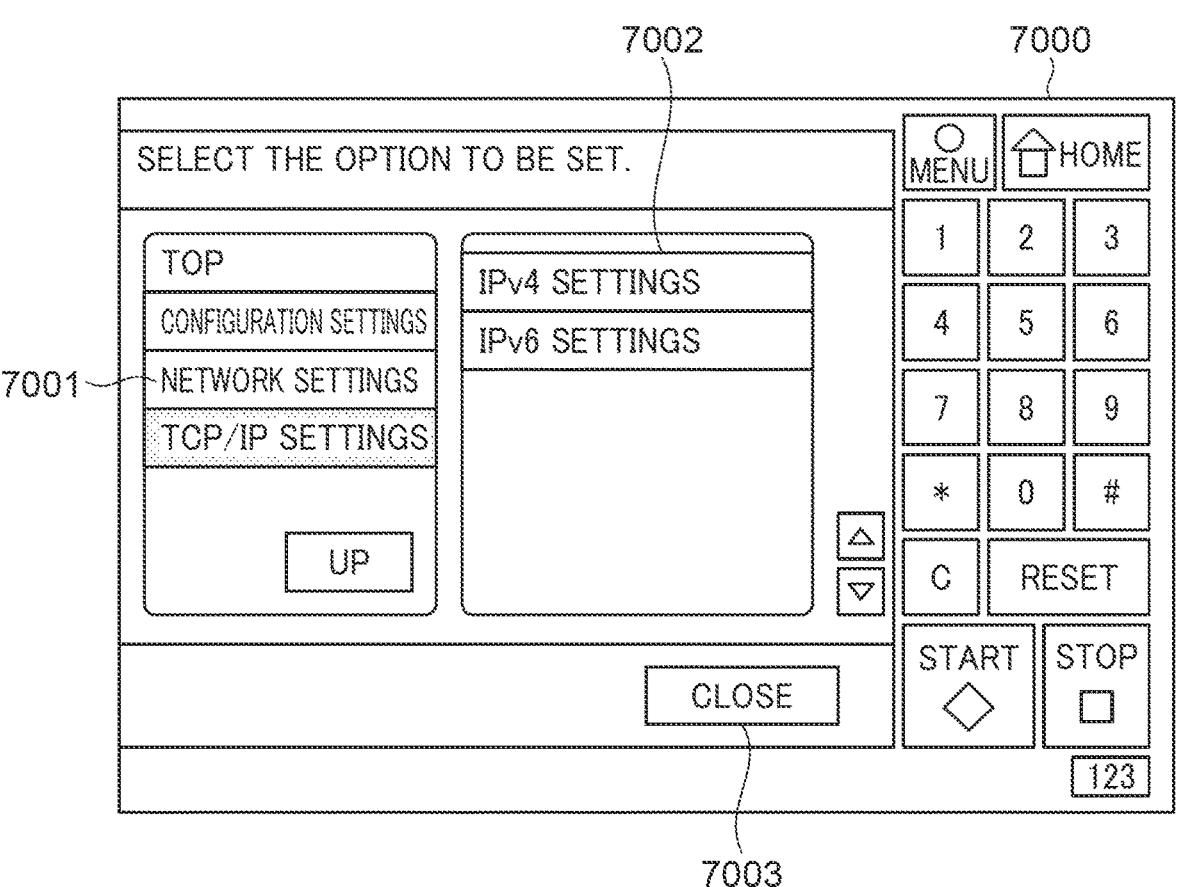
FIG. 7A is a view illustrating an example of an IP address setting menu screen.
Figure 9:
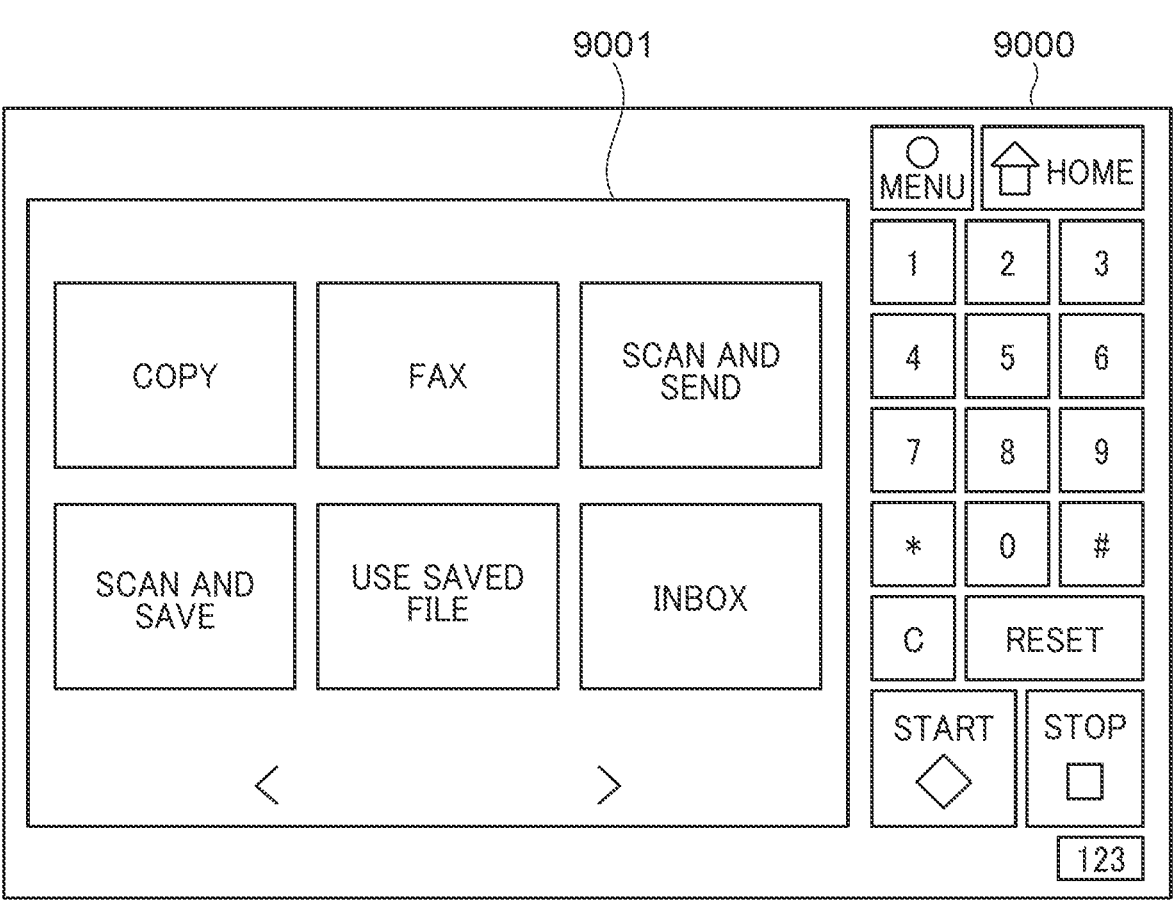
FIG. 9 is a view illustrating an example of a home screen.
Figure 10:
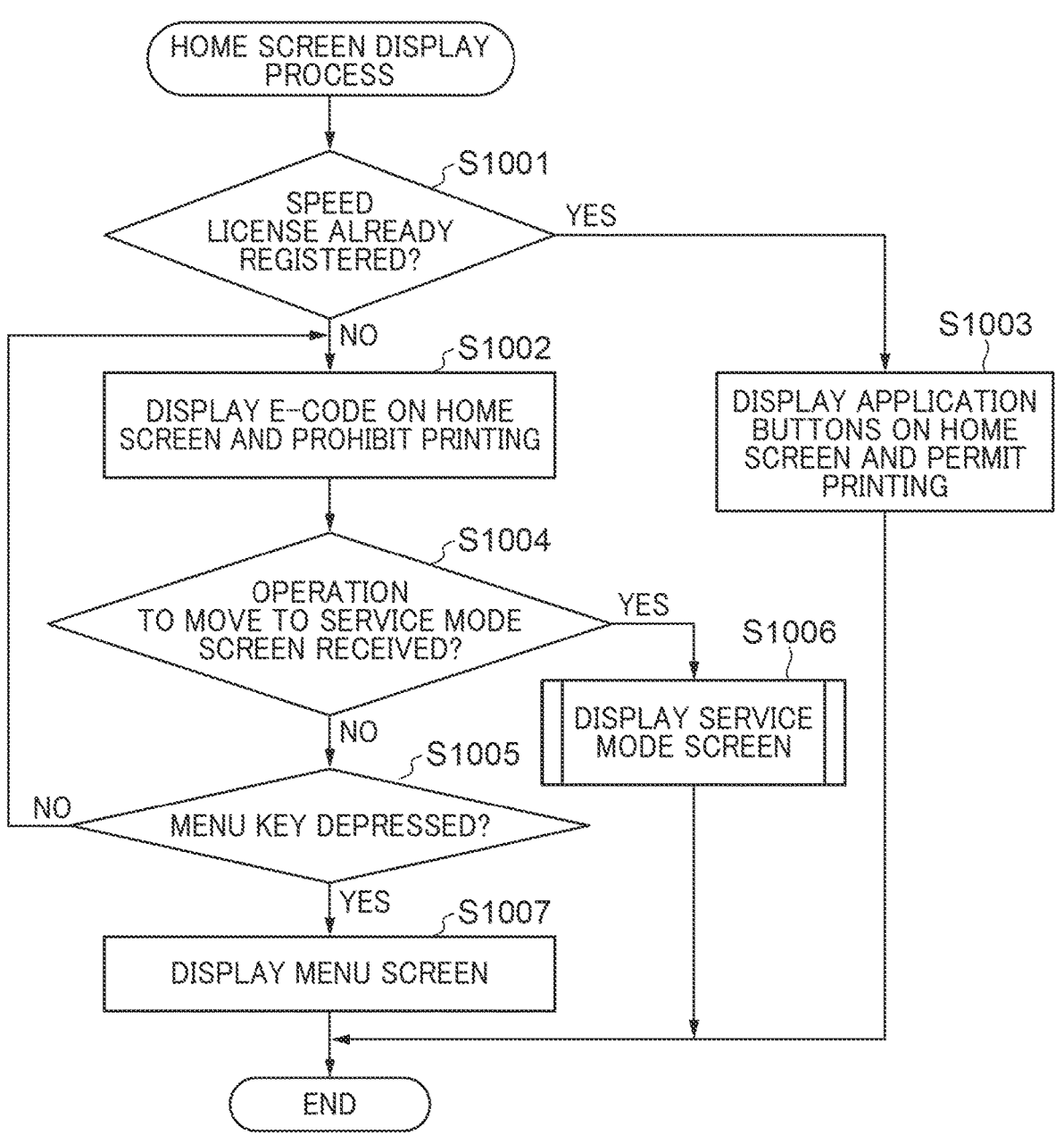
FIG. 10 is a flowchart illustrating a process relating to displaying a home screen.

A description will now be given of screen displays (menu screen displays) in the speed license unregistered state with reference to FIG. 4, FIG. 7A, FIG. 9, FIG. 10, and FIG. 13. FIG. 4 is a view illustrating an example of a home screen on which an E-code is indicated. FIG. 7A is a view illustrating an example of an IP address setting menu screen. FIG. 9 is a view illustrating an example of a home screen. FIG. 10 is a flowchart illustrating a process that is carried out when the home screen is displayed (home screen display process). FIG. 13 is a flowchart illustrating an IP address setting process. Control programs based on the flowcharts of FIG. 10 and FIG. 13 are executed by the CPU 107.

A description will now be given of the home screen display process under the speed license unregistered state. As illustrated in FIG. 10, in step S1001, the CPU 107 determines whether or not the speed license has already been registered on the image forming apparatus 101. This determination is made according to whether or not a print speed stored in the EEPROM 111 has not yet been fixed. As a result of the determination in the step S1001, when it is determined that the speed license has not yet been registered on the image forming apparatus 101, the process proceeds to step S1002. On the other hand, as a result of the determination in the step S1001, when it is determined that the speed license has already been registered on the image forming apparatus 101, the process proceeds to step S1003.

In the step S1003, the CPU 107 controls the display unit 103 to display a home screen 9000. The home screen 9000 indicates various application buttons in a display area 9001 (see FIG. 9). For example, the CPU 107 is allowed to receive a reading instruction for scanning a document placed on the scanner unit 106 through one of the application buttons. In the step S1003, printing is permitted under the control of the CPU 107 so that the printer unit 105 can perform printing at a speed determined by the speed license.

In the step S1002, the CPU 107 controls the display unit 103 to display a home screen 4000. The home screen 4000 indicates an E-code in place of the various application buttons in a display area 4001 (see FIG. 4). In the step S1002, use of the various applications is not allowed, and printing is prohibited in the image forming apparatus 101. The home screen 4000 includes a menu key 4002, a numeric keypad 4003, a counter key 4004, and a reset button 4005 as well as the display area 4001.

In a case where a menu screen is displayed under the speed license unregistered state, the step S1002 is executed, and then the process proceeds to step S1004 and step S1005 in this order. A description of the step S1004 will be given later.

In the step S1005, the CPU 107 determines whether or not the depression of the menu key 4002 in the home screen 4000 has been detected. As a result of the determination in the step S1005, when it is determined that the depression of the menu key 4002 has been detected, the process proceeds to step S1007. On the other hand, as a result of the determination in the step S1005, when it is determined that the depression of the menu key 4002 has not been detected, the process returns to the step S1002, and the step S1002 and the subsequent steps are sequentially executed.

In the step S1007, the CPU 107 controls the display unit 103 to display a menu screen and ends the home screen display process.

A description will now be given of the IP address setting process. As illustrated in FIG. 13, in step S1301, the CPU 107 determines whether or not the speed license has not yet been registered, and the special NET setting mode is disabled (whether or not the value of SP_NET_MODE is zero) for the image forming apparatus 101. As a result of the determination in the step S1301, when it is determined that the speed license has not yet been registered and the special NET setting mode is disabled for the image forming apparatus 101, the process proceeds to step S1310. On the other hand, as a result of the determination in the step S1301, when the speed license has not yet been registered and the special NET setting mode is not disabled for the image forming apparatus 101, the process proceeds to step S1302.

In the step S1310, the CPU 107 controls the display unit 103 to display a menu screen 7000 (see FIG. 7A). In the menu screen 7000, a network setting menu 7001 is, for example, grayed out to make it not selectable. In this state, an IP address setting for the image forming apparatus 101 is prohibited and a user is not allowed to connect the image forming apparatus 101 to a network. It should be noted that, to register the speed license, a method in which an issued license key is registered from a screen of the image forming apparatus 101, a PC connected to the image forming apparatus 101, or the like by manually inputting the license key is generally used, a description of which is omitted.

The menu screen 7000 (the network setting menu 7001) is a first screen on which a first network setting that sets up a network available to receive image data for image formation is carried out. The CPU 107 (the controller unit 102) is configured to control the display unit 103 to display the menu screen 7000 (display control step). In the speed license unregistered state, the CPU 107 prohibits the use (operation) of the printer unit 105 and also prohibits carrying out the first network setting on the menu screen 7000.

Enabling the Special NET Setting Mode

Referring to FIG. 5, FIG. 6, FIG. 9, FIG. 10, FIG. 11, and FIG. 12, it will now be described that the special NET setting mode for carrying out network settings can be enabled even in the speed license unregistered state.

It should be noted that in the present embodiment, a special mode which a serviceperson who installs the image forming apparatus 101 uses in the image forming apparatus 101 is referred to as a "service mode", and a screen that is displayed on the display unit 103 for operations in the service mode is referred to as a "service mode screen". Those who perform the operations in the service mode are not particularly limited to servicepersons because there may be cases where not only the serviceperson but also a specific person such as a delivery person for the image forming apparatus 101 performs the operations.

Figure 5:
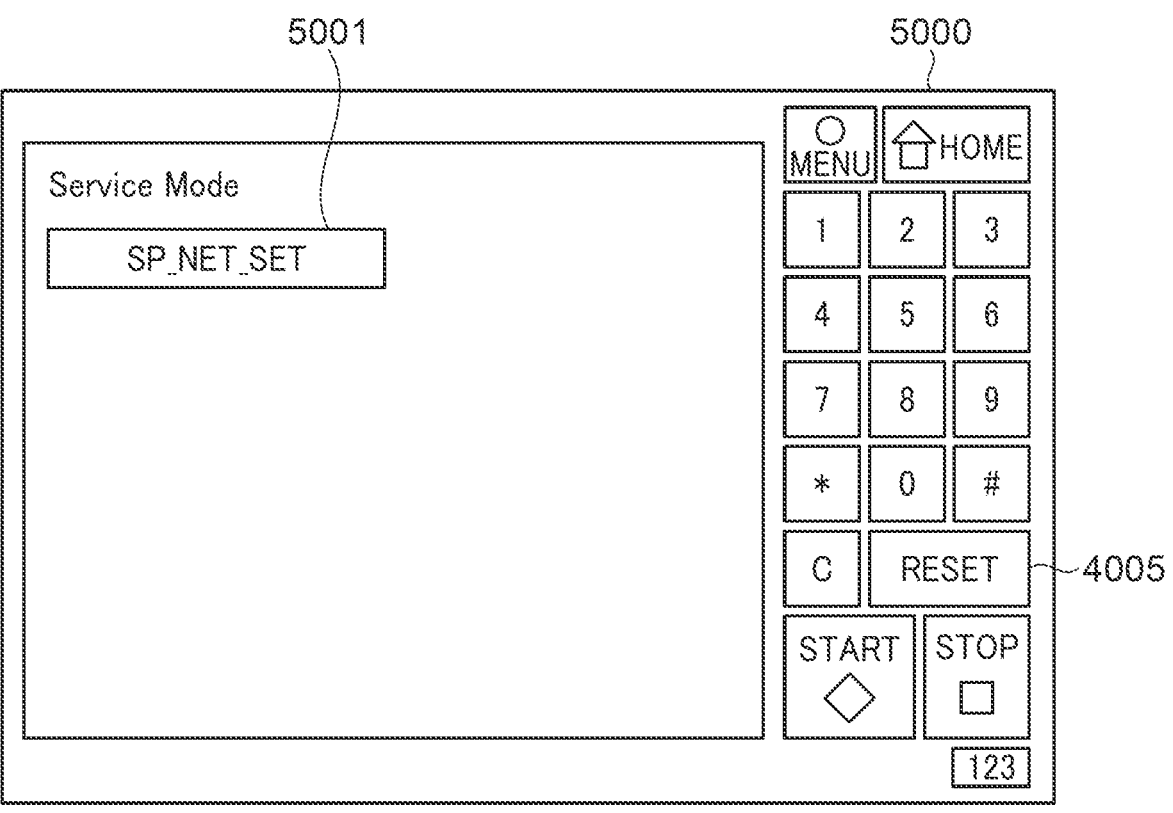
FIG. 5 is a view illustrating an example of a service mode screen.
Figure 6:
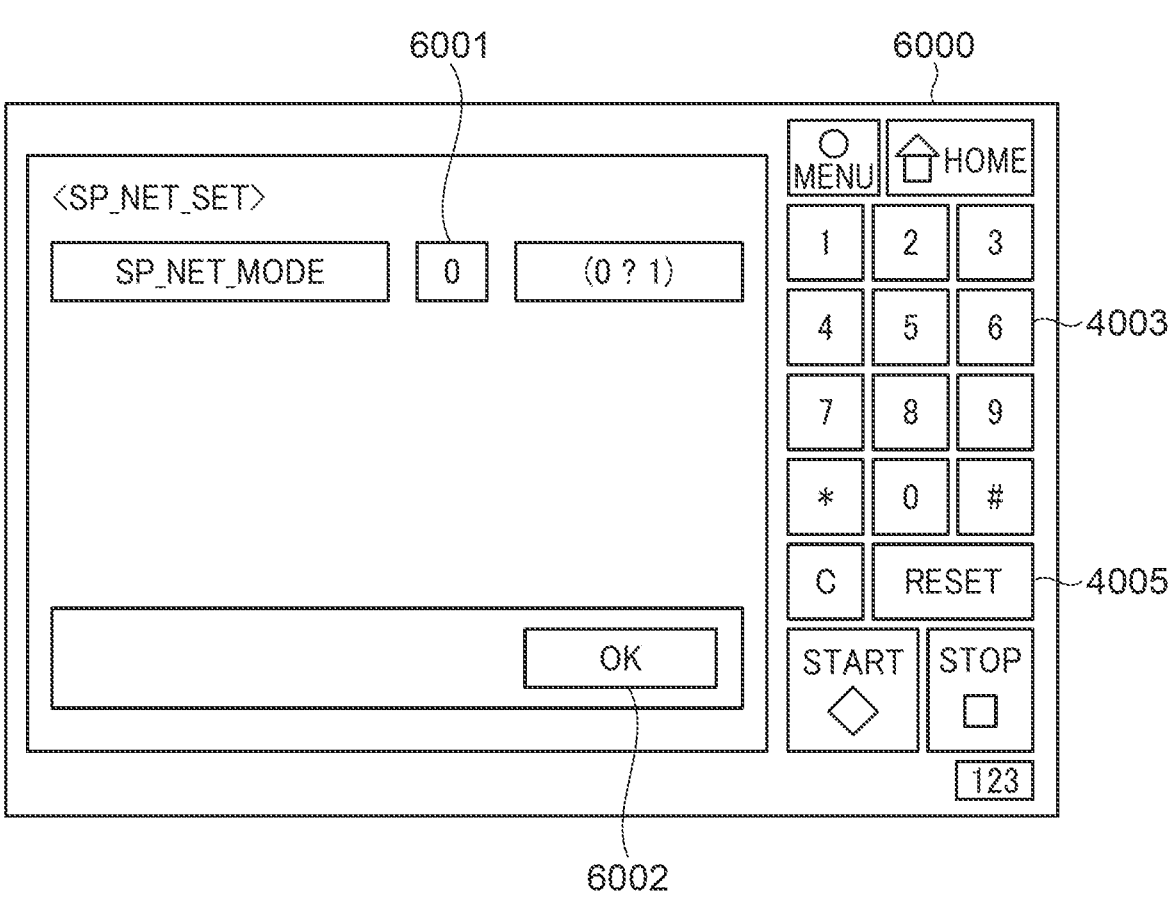
FIG. 6 is a view illustrating an example of a special NET setting mode screen.
Figure 11:
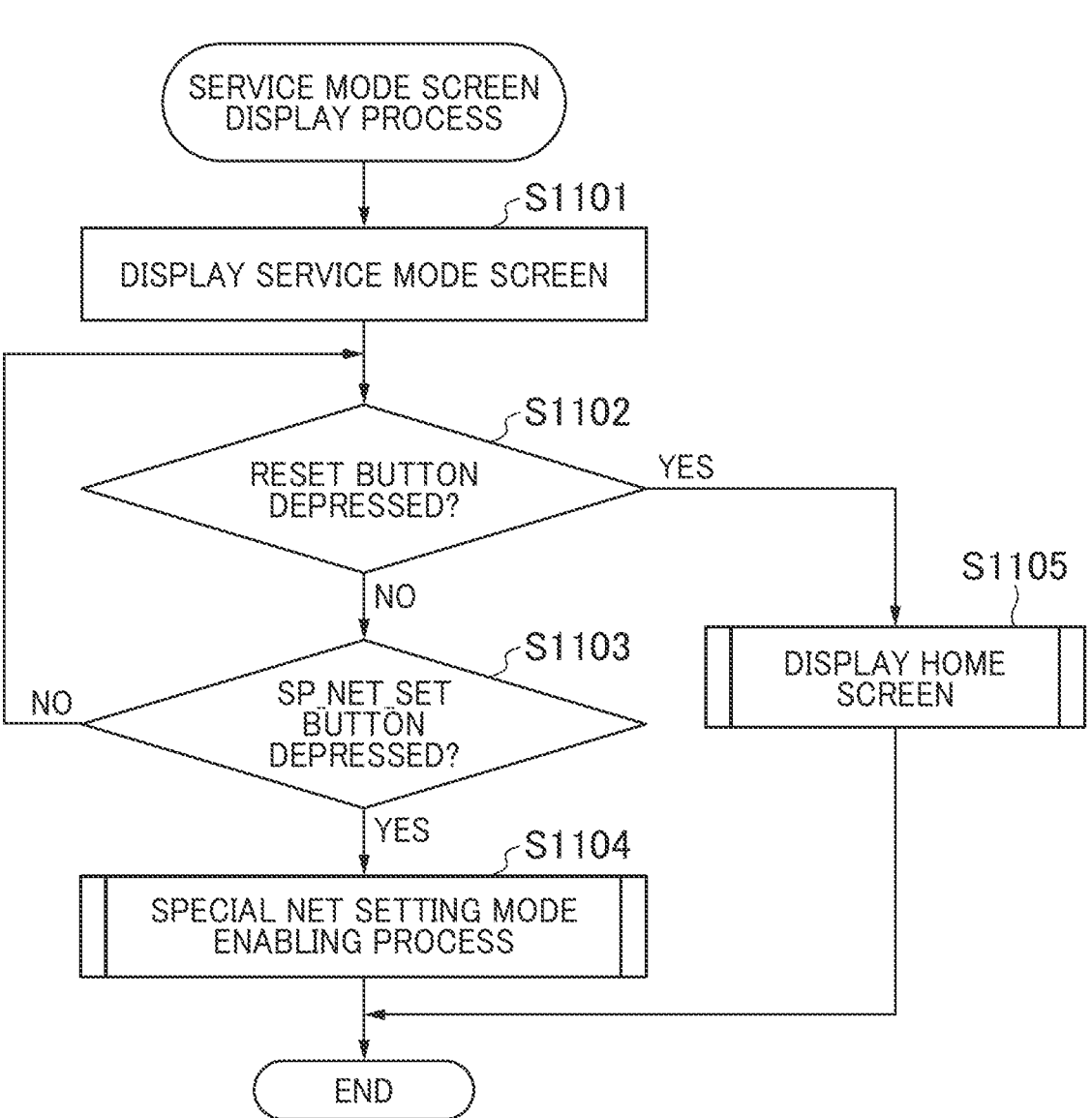
FIG. 11 is a flowchart illustrating a process relating to displaying a service mode screen.
Figure 12:
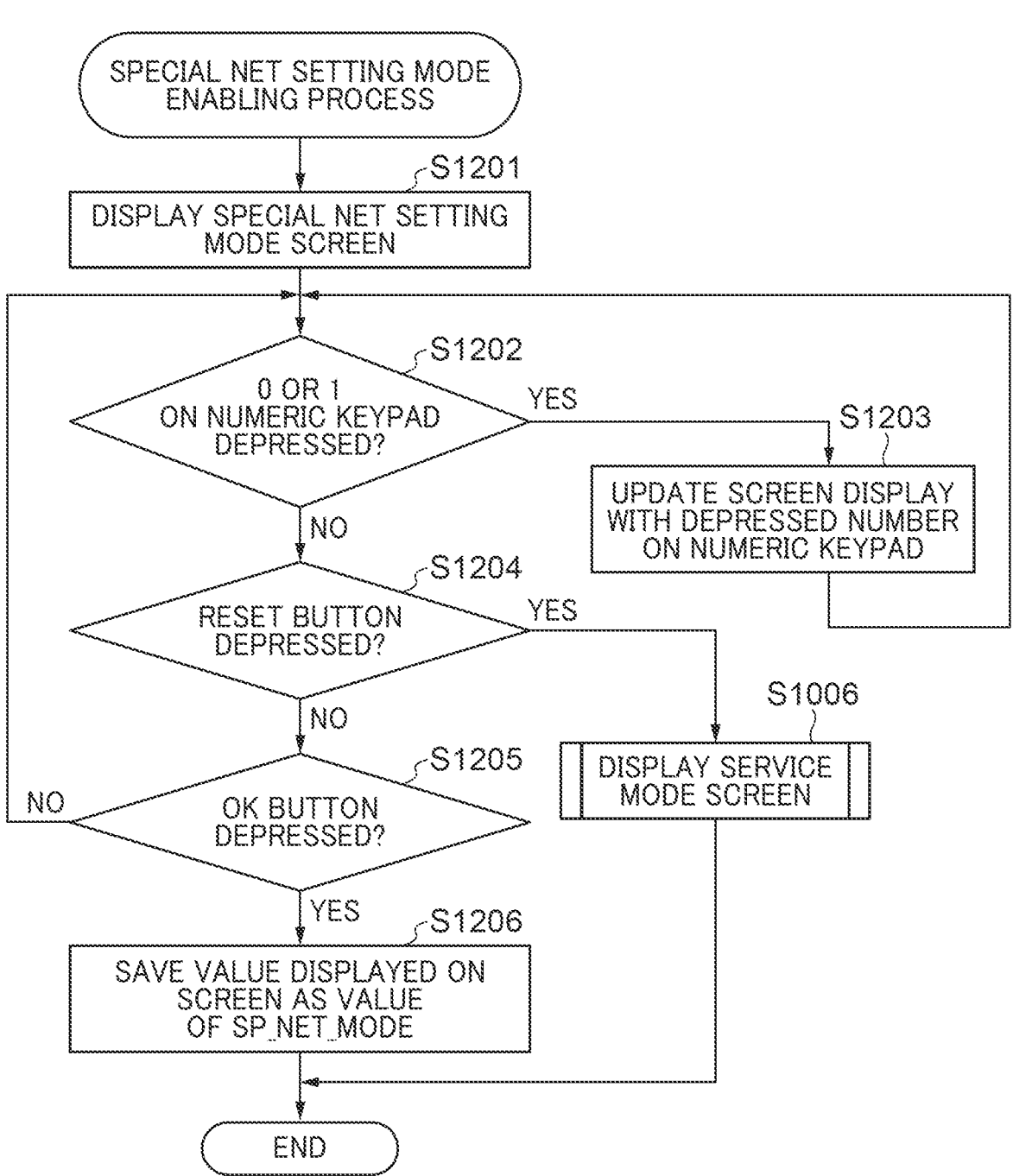
FIG. 12 is a flowchart illustrating a special NET setting mode enabling process.

FIG. 5 is a view illustrating an example of the service mode screen. FIG. 6 is a view illustrating an example of a special NET setting mode screen. FIG. 11 is a flowchart illustrating a process relating to displaying the service mode screen (service mode screen display process). FIG. 9 is the view illustrating the example of the home screen. FIG. 12 is a flowchart illustrating a special NET setting mode enabling process. Control programs based on the flowcharts of FIG. 11 and FIG. 12 are executed by the CPU 107.

As illustrated in FIG. 10, in the step S1004 after the execution of the step S1002, the CPU 107 determines whether or not a signal for moving to the service mode screen has been received from the operation unit 104. As a result of the determination in the step S1004, when it is determined that the signal has been received, the process proceeds to step S1006. In the step S1006, the CPU 107 carries out the service mode screen display process (see FIG. 11). On the other hand, as a result of the determination in the step S1004, when it is determined that the signa has not been received, the process proceeds to the step S1005.

As illustrated in FIG. 11, in step S1101, the CPU 107 controls the display unit 103 to display a service mode screen 5000 (see FIG. 5). The service mode screen 5000 includes the reset button 4005 and an SP_NET_SET button 5001.

In step S1102, the CPU 107 determines whether or not the depression of the reset button 4005 in the service mode screen 5000 has been detected. As a result of the determination in the step S1102, when it is determined that the depression of the reset button 4005 has been detected, the process proceeds to step S1105. On the other hand, as a result of the determination in the step S1102, when it is determined that the depression of the reset button 4005 has not been detected, the process proceeds to step S1103.

In the step S1103, the CPU 107 determines whether or not the depression of the SP_NET_SET button 5001 in the service mode screen 5000 has been detected. As a result of the determination in the step S1103, when it is determined that the depression of the SP_NET_SET button 5001 has been detected, the process proceeds to step S1104. On the other hand, as a result of the determination in the step S1103, when it is determined that the depression of the SP_NET_SET button 5001 has not been detected, the process returns to the step S1102, and the step S1102 and the subsequent steps are sequentially executed.

In the step S1104, the CPU 107 carries out the special NET setting mode enabling process (see FIG. 12) and ends the service mode screen display process.

In the step S1105, the CPU 107 carries out the home screen display process, in which the CPU 107 controls the display unit 103 to display the home screen 4000 (see FIG. 4) or the home screen 9000 (see FIG. 9) and ends the service mode screen display process.

As illustrated in FIG. 12, in step S1201, the CPU 107 controls the display unit 103 to display a special NET setting mode screen 6000 (see FIG. 6). The special NET setting mode screen 6000 includes the numeric keypad 4003, the reset button 4005, a mode value 6001, and an OK button 6002.

In step S1202, the CPU 107 determines whether or not the depression of "0" or "1" on the numeric keypad 4003 in the special NET setting mode screen 6000 has been detected. As a result of the determination in the step S1202, when it is determined that the depression of "0" or "1" has been detected, the process proceeds to step S1203. On the other hand, as a result of the determination in the step S1202, when it is determined that the depression of "0" or "1" has not been detected, the process proceeds to step S1204.

In the step S1203, the CPU 107 updates the mode value 6001 on the special NET setting mode screen 6000 with the value on the numeric keypad 4003 detected in the step S1202.

In the step S1204, the CPU 107 determines whether or not the depression of the reset button 4005 in the special NET setting mode screen 6000 has been detected. As a result of the determination in the step S1204, when it is determined that the depression of the reset button 4005 has been detected, the process proceeds to the step S1006. In the step S1006, the CPU 107 controls the display unit 103 to display the service mode screen 5000 and ends the special NET setting mode enabling process. On the other hand, as a result of the determination in the step S1204, when it is determined that the depression of the reset button 4005 has not been detected, the process proceeds to step S1205.

In the step S1205, the CPU 107 determines whether or not the depression of the OK button 6002 in the special NET setting mode screen 6000 has been detected. As a result of the determination in the step S1205, when it is determined that the depression of the OK button 6002 has been detected, the process proceeds to step S1206. On the other hand, as a result of the determination in the step S1205, when it is determined that the depression of the OK button 6002 has not been detected, the process returns to the step S1202, and the step S1202 and the subsequent steps are sequentially executed.

In the step S1206, the CPU 107 updates the value of SP_NET_MODE stored in the RAM 109 with the mode value 6001 displayed on the special NET setting mode screen 6000 and ends the special NET setting mode enabling process.

Setting Up an IP Address in the Special NET Setting Mode Enabled State

Figure 7B:
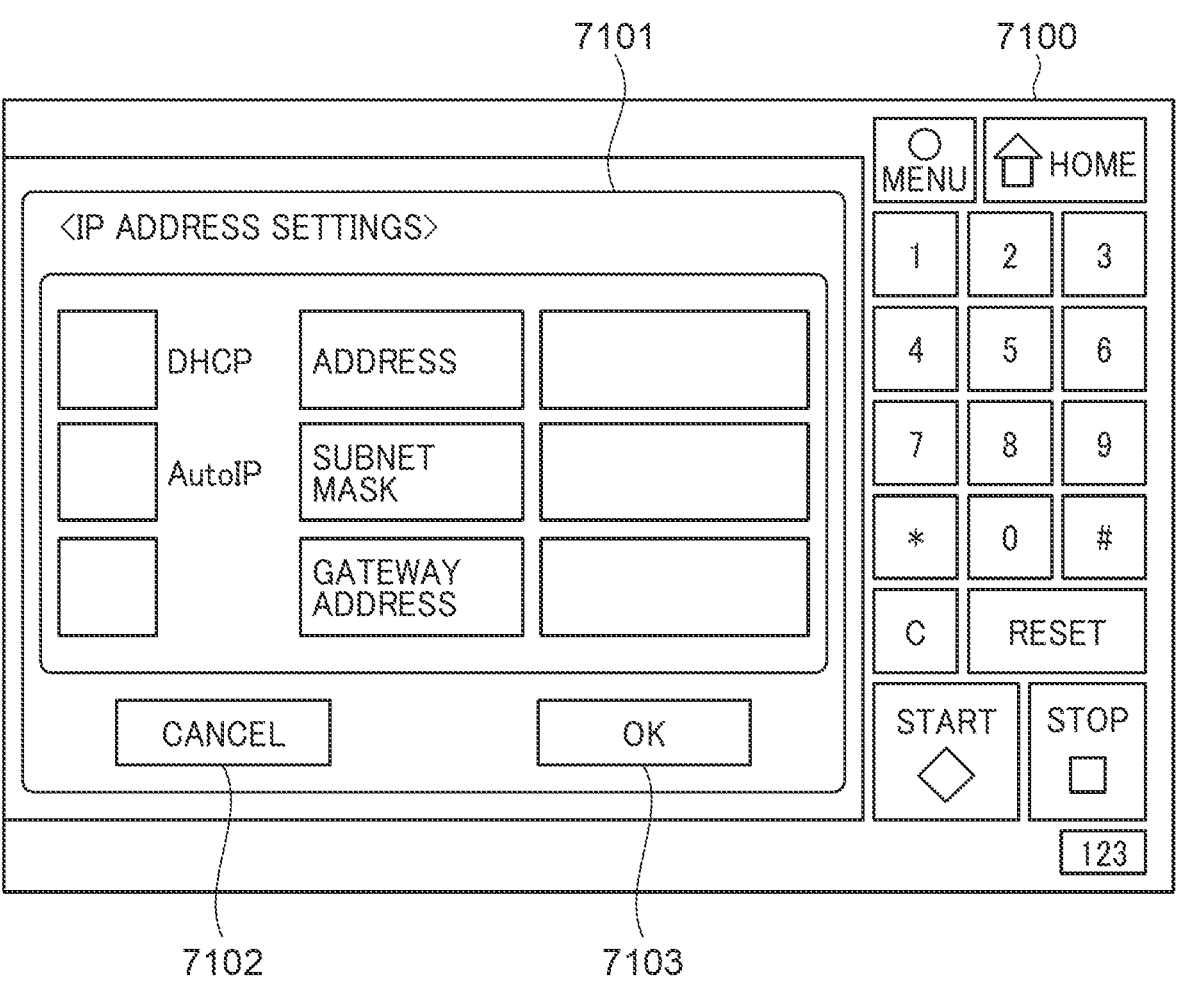
FIG. 7B is a view illustrating an example of an IPv4 setting screen.

Referring to FIG. 7B and FIG. 13, a description will now be given of how an IP address is set up in a state where special NET setting mode is enabled. FIG. 7B is a view illustrating an example of an IPv4 setting screen.

As described earlier, as a result of the determination in the step S1301, when it is determined that the speed license has not been registered and the special NET setting mode is not disabled for the image forming apparatus 101, the process proceeds to the step S1302. The case where the process proceeds to the step S1302 means that SP_NET_MODE stored in the RAM 109 has the value of "1" indicating "enabled" even though the speed license has not been registered on the image forming apparatus 101.

As illustrated in FIG. 13, in the step S1302, the CPU 107 controls the display unit 103 to display the menu screen 7000 in which the network setting menu 7001 is made selectable (see FIG. 7A).

In step S1303, the CPU 107 determines whether or not the depression of a close button 7003 in the menu screen 7000 has been detected. As a result of the determination in the step S1303, when it is determined that the depression of the close button 7003 has been detected, the process proceeds to the step S1105. In the step S1105, the CPU 107 carries out the home screen display process. On the other hand, as a result of the determination in the step S1303, when it is determined that the depression of the close button 7003 has not been detected, the process proceeds to step S1304.

In the step S1304, the CPU 107 determines whether or not the depression of an IPv4 setting 7002 on the menu screen 7000 has been detected. As a result of the determination in the step S1304, when it is determined that the depression of the IPv4 setting 7002 has been detected, the process proceeds to step S1305. On the other hand, as a result of the determination in the step S1304, when it is determined that the depression of the IPv4 setting 7002 has not been detected, the process returns to the step S1302, and the step S1302 and the subsequent steps are sequentially executed.

In the step S1305, the CPU 107 controls the display unit 103 to display an IPv4 setting screen 7100 (see FIG. 7B). The IPv4 setting screen 7100 indicates IPv4-related setting menu options in a display area 7101. The IPv4 setting screen 7100 further indicates an OK button 7103 for confirming a setting and a cancel button 7102 for cancelling a setting process and going back.

In step S1306, the CPU 107 receives inputs to the respective IPV4-related setting menu options.

In step S1307, the CPU 107 determines whether or not the depression of the OK button 7103 in the IPv4 setting screen 7100 has been detected. As a result of the determination in the step S1307, when it is determined that the depression of the OK button 7103 has been detected, the process proceeds to step S1309. On the other hand, as a result of the determination in the step S1307, when it is determined that the depression of the OK button 7103 has not been detected, the process proceeds to step S1308.

In the step S1308, the CPU 107 determines whether or not the depression of the cancel button 7102 in the IPv4 setting screen 7100 has been detected. As a result of the determination in the step S1308, when it is determined that the depression of the cancel button 7102 has been detected, the process returns to the step S1302, and the step S1302 and the subsequent steps are sequentially executed. On the other hand, as a result of the determination in the step S1308, when it is determined that the depression of the cancel button 7102 has not been detected, the process returns to the step S1305, and the step S1305 and the subsequent steps are sequentially executed.

In the step S1309, the CPU 107 stores the various setting options relating to IPv4 input in the step S1306 in the RAM 109 and ends the IP address setting process.

Figure 8A:
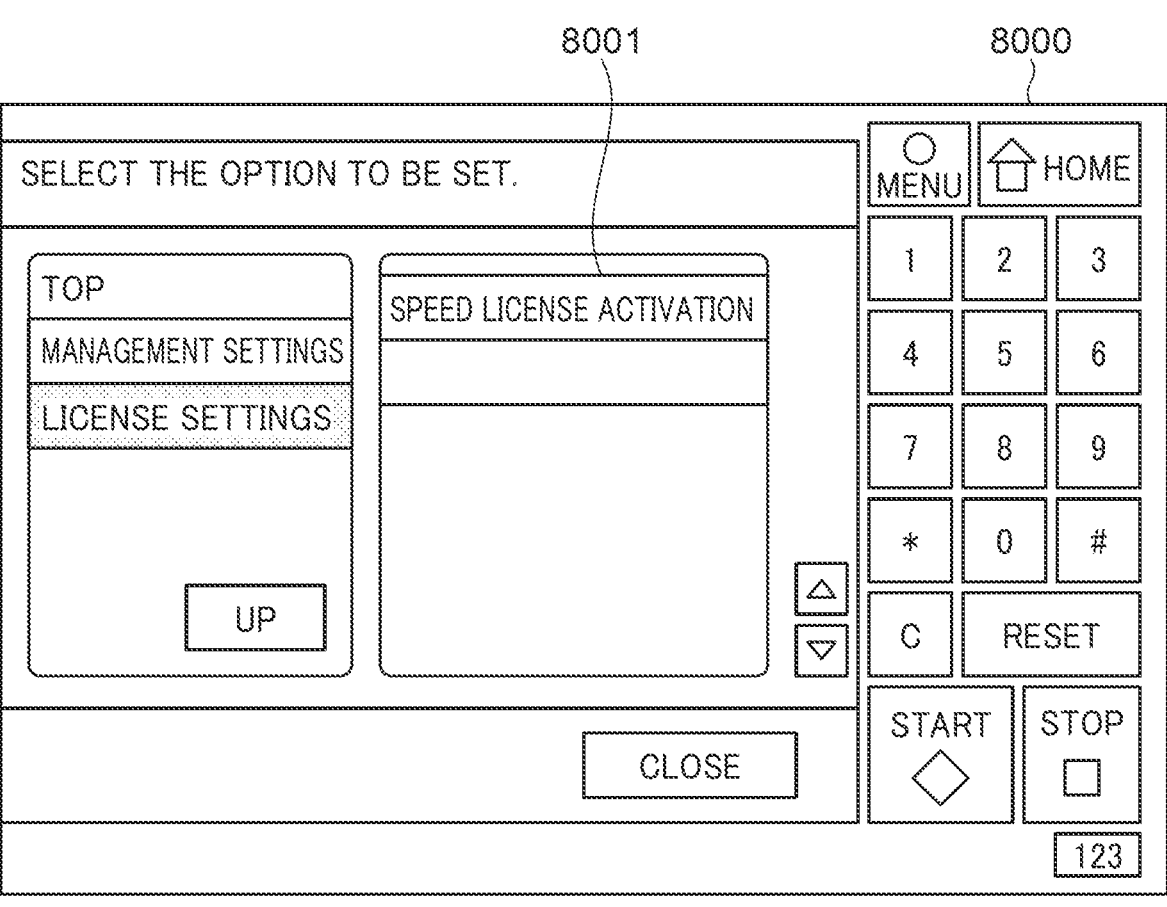
FIG. 8A is a view illustrating an example of a speed license setting menu screen.
Figure 8B:
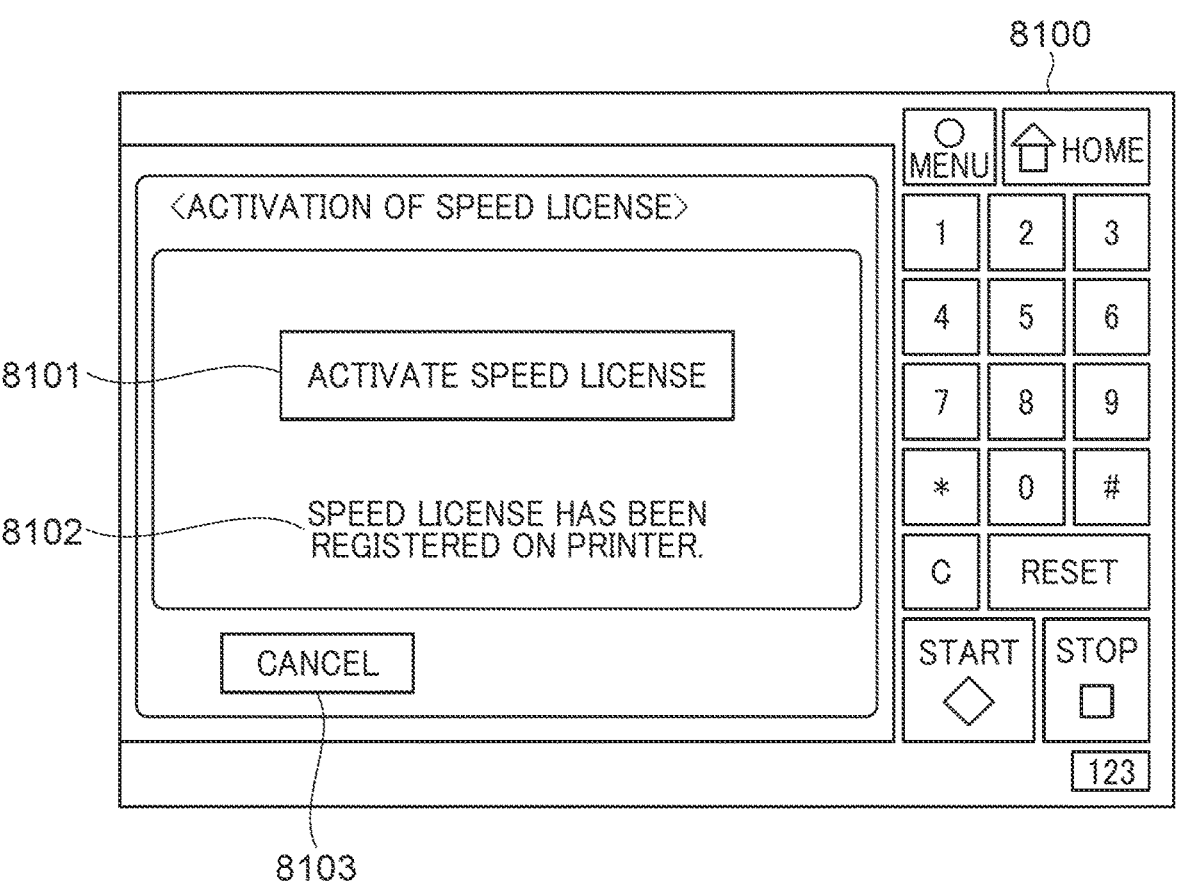
FIG. 8B is a view illustrating an example of a speed license registration screen.
Figure 14:
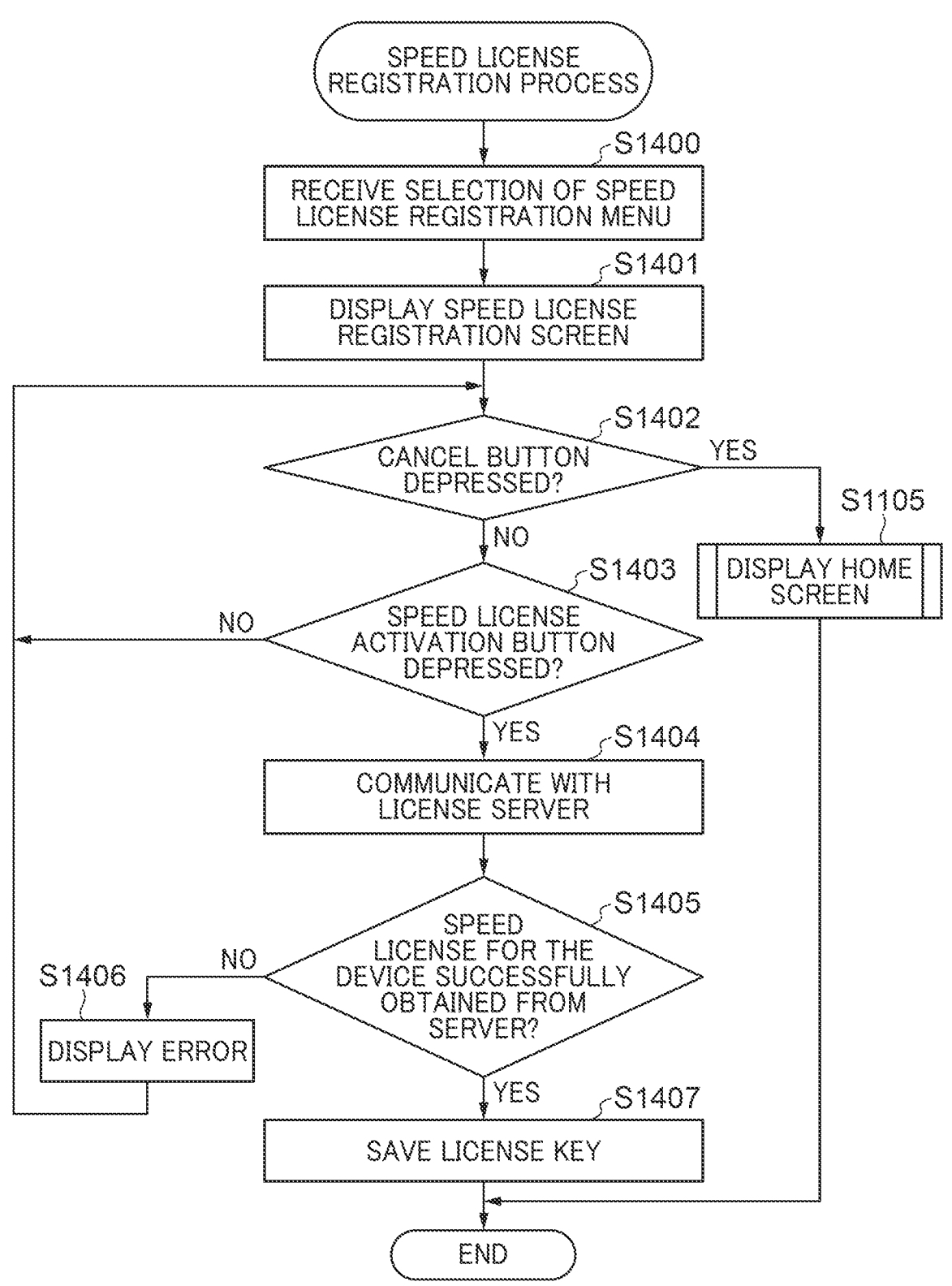
FIG. 14 is a flowchart illustrating a speed license registration process.

As described above, the screens for the special NET setting mode include multiple types of screens (the special NET setting mode screen 6000, the menu screen 7000, etc.) that the display unit 103 sequentially displays according to user's operations on thereon. These screens are second screens on which second network setting is carried out in the speed license unregistered state (the speed license inactive state), where the second network setting is a setting that sets up a network available for use in license authentication in which the use of the printer unit 105 is permitted. These second screens allow a user to set up the IP address of the image forming apparatus 101 and connect the image forming apparatus 101 to the network 301 while the special NET setting mode is enabled in the image forming apparatus 101.
Speed License Registration Process Using Network Referring to FIG. 8A, FIG. 8B, and FIG. 14, a description will now be given of a process in which a speed license is registered using a network. FIG. 8A is a view illustrating an example of a speed license setting menu screen. FIG. 8B is a view illustrating an example of a speed license registration screen. FIG. 14 is a flowchart illustrating a speed license registration process. A control program based on the flowcharts of FIG. 14 is executed by the CPU 107.

As illustrated in FIG. 14, in step S1400, the CPU 107 controls the display unit 103 to display a license setting menu screen 8000 (see FIG. 8A). Then, the CPU 107 receives the selection of a speed license activation menu 8001 in the license setting menu screen 8000.

In step S1401, the CPU 107 controls the display unit 103 to display a speed license registration screen 8100 (see FIG. 8B). The speed license registration screen 8100 includes a speed license activation button 8101, a message area 8102, and a cancel button 8103.

In step S1402, the CPU 107 determines whether or not the depression of the cancel button 8103 in the speed license registration screen 8100 has been detected. As a result of the determination in the step S1402, when it is determined that the depression of the cancel button 8103 has been detected, the process proceeds to the step S1105. In the step S1105, the CPU 107 carries out the home screen display process. On the other hand, as a result of the determination in the step S1402, when it is determined that the depression of the cancel button 8103 has not been detected, the process proceeds to step S1403.

In the step S1403, the CPU 107 determines whether or not the depression of the speed license activation button 8101 in the speed license registration screen 8100 has been detected. As a result of the determination in the step S1403, when it is determined that the depression of the speed license activation button 8101 has been detected, the process proceeds to step S1404. On the other hand, as a result of the determination in the step S1403, when it is determined that the depression of the speed license activation button 8101 has not been detected, the process returns to the step S1402, and the step S1402 and the subsequent steps are sequentially executed.

In the step S1404, the CPU 107 controls the network OF 112 to make a connection to the license server 201 via network communication. After connecting to the license server 201, the CPU 107 obtains the device serial ID 202 (serial number) of the image forming apparatus 101 stored in the EEPROM 111. Then, based on the device serial ID 202 and the license type ID 203 of a speed license, the CPU 107 retrieves the license key 204 for the speed license from the database in FIG. 2. It is assumed that in the database in FIG. 2, only one speed license is registered for the license type ID 203. The reason is that the activation of a plurality of speed licenses is restricted for one image forming apparatus 101.

In step S1405, the CPU 107 determines whether or not the license key has been successfully obtained from the license server 201. As a result of the determination in the step S1405, when it is determined that the license key has been successfully obtained, the process proceeds to step S1407. On the other hand, as a result of the determination in the step S1405, when it is determined that the license key has not been successfully obtained, the process proceeds to step S1406. It should be noted that the cases where the license key has not been successfully obtained include a case where the connection to the license server 201 has failed.

In the step S1406, the CPU 107 controls the display unit 103 to display an error in the message area 8102 in the speed license registration screen 8100. The process then returns to the step S1402, and the step S1402 and the subsequent steps are sequentially executed.

In the step S1407, the CPU 107 stores the license key in the RAM 109 and ends the speed license registration process. At this time, the CPU 107 may control the display unit 103 to display a message saying that the speed license has been registered on the image forming apparatus 101 in the message area 8102 in the speed license registration screen 8100.

As described above, in license authentication for the image forming apparatus 101, there may be cases where an operation restriction (the network setting operation is restricted) or a function restriction (the use of the image forming unit is prohibited) is enforced in the image forming apparatus 101. Even in those cases, while the special NET setting mode is enabled for the image forming apparatus 101, temporary use of the restricted operation or function is permitted in the image forming apparatus 101. Thus, a license can be authenticated on the image forming apparatus 101, that is, a speed license can be registered on the image forming apparatus 101 using a network.

Second Embodiment

Figure 15A:
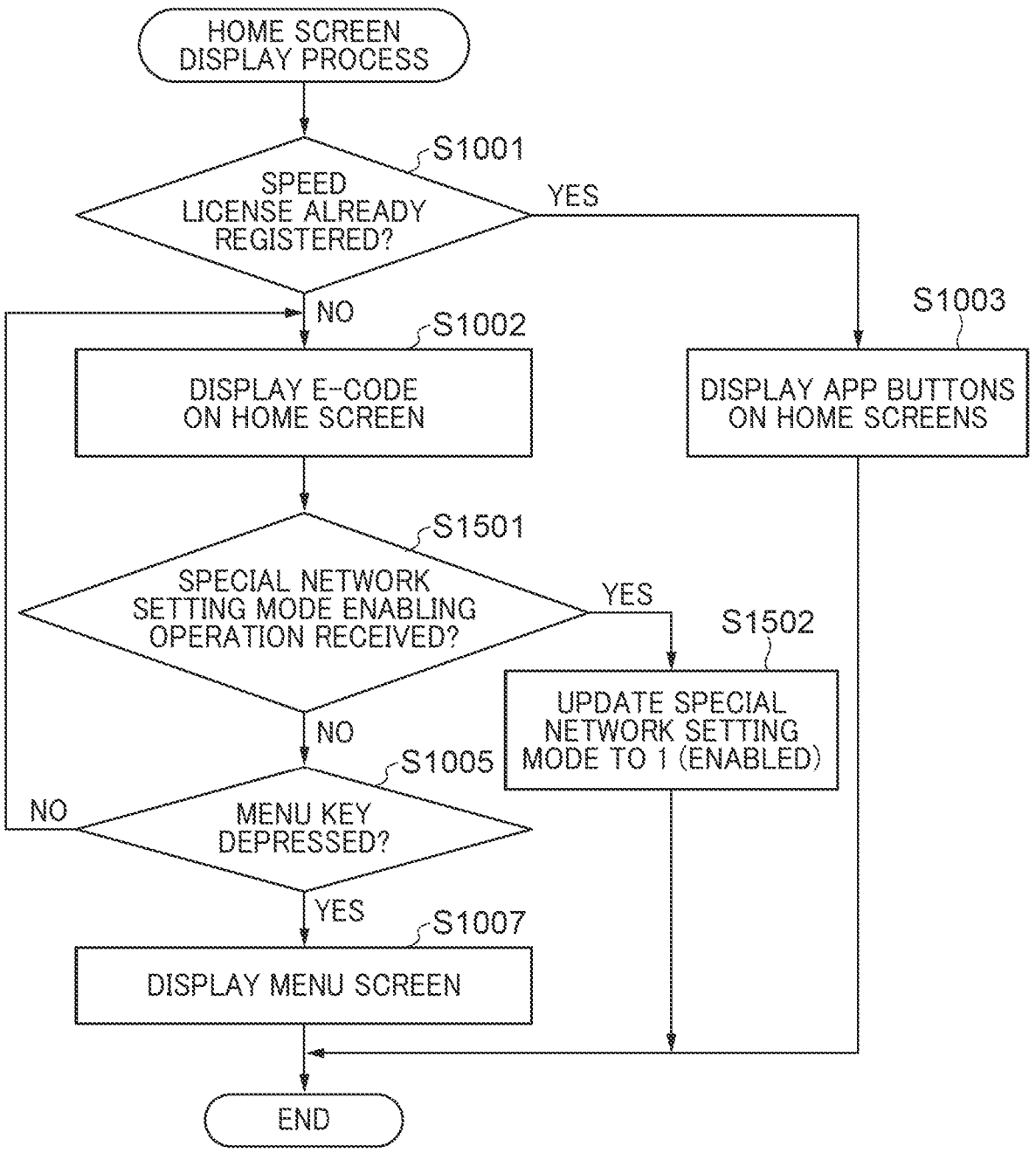
FIG. 15A is a flowchart illustrating a process relating to displaying the home screen according to a second embodiment.
Figure 15B:
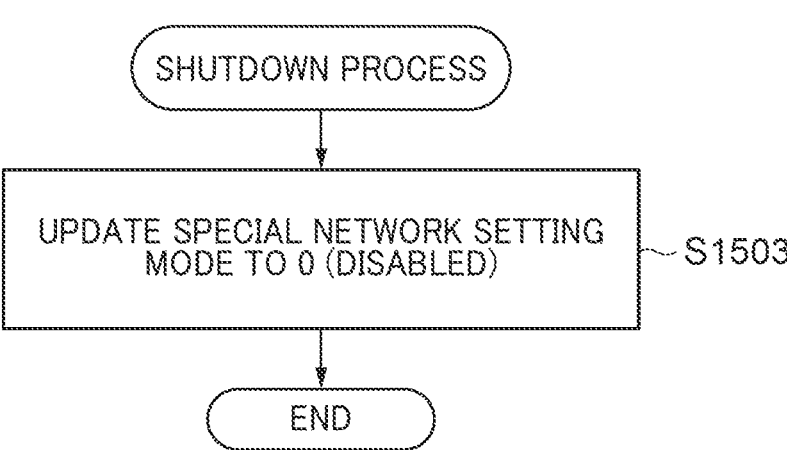
FIG. 15B is a flowchart illustrating a shutdown process according to the second embodiment.

A description will now be given of a second embodiment with reference to FIG. 15A and FIG. 15B. Features that are different from those of the first embodiment will be mainly described below, and matters features that are the same those of the first embodiment will thus not be described. Here, a description will be given of how the special NET setting mode is enabled and disabled in the image forming apparatus 101.
Enabling and Disabling of the Special NET Setting Mode FIG. 15A is a flowchart illustrating a process that is carried out when the home screen is displayed (home screen display process), which is given for explaining a special NET setting mode enabling process according to the second embodiment. FIG. 15B is a flowchart illustrating a shutdown process, which is given for explaining a special NET setting mode disabling process according to the second embodiment. Control programs based on the flowcharts of FIG. 15A and FIG. 15B are executed by the CPU 107. The process in the flowchart of FIG. 15A is the same as the process in the flowchart of FIG. 10 except for step S1501 and step S1502, and hence description will be given of these two steps.

First, referring to FIG. 15A, a description will be given of how the special NET setting mode is enabled. As illustrated in FIG. 15A, in the step S1501, the CPU 107 determines whether or not a special key operation that enables the special NET setting mode has been detected from the operation unit 104. As a result of the determination in the step S1501, when it is determined that the special key operation has been detected, the process proceeds to the step S1502. On the other hand, as a result of the determination in the step S1501, when it is determined that the special key operation has not been detected, the process proceeds to the step S1005.

In the step S1502, the CPU 107 updates the value of SP_NET_MODE stored in the RAM 109 to "1 (enabled)" and stores the updated value. It should be noted that "the special key operation" is, for example, a key operation in which two or more among a plurality of key buttons including the numeric keypad 4003, the counter key 4004, and another key such as the menu key 4002 are depressed a number of times determined in advance and in an order determined in advance. Examples of the special key operation include an operation in which the counter key 4004 is sequentially depressed three times, and then "1", "2", and "3" on the numeric keypad 4003 are depressed in this order.

As described above, in the image forming apparatus 101, the CPU 107 controls the display unit 103 to display an operation part including the plurality of key buttons so as to enable the special NET setting mode (receive a user's operation relating to license authentication performed on the second screen). Then, when it is determined that a user's operation performed on at least two key buttons among the plurality of key buttons a predetermined number of times and in a predetermined order (the user's operation that enables the special NET setting mode) has been detected, the CPU 107 enables the special NET setting mode. Enabling the special NET setting mode allows a user to set up an IP address of the image forming apparatus 101 and register a speed license on the image forming apparatus 101 via a network as with the first embodiment.

Referring to FIG. 15B, a description will be given of how the special NET setting mode is disabled. Disabling the special NET setting mode is carried out in the process of shutting down the image forming apparatus 101. As illustrated in FIG. 15B, in step S1503, the CPU 107 updates the value of SP_NET_MODE stored in the RAM 109 to "0 (disabled)". As a result, the special NET setting mode is disabled.

Third Embodiment

Referring to FIG. 16 to FIG. 22, a description will now be given of a third embodiment. Features that are different from those of the embodiments described above will be mainly described below, and matters features that are the same those of the embodiments described above will thus not be described. In the first embodiment and the second embodiment described above, network settings are prohibited in the image forming apparatus 101 in the speed license unregistered state. A description will be given of a case where in the present embodiment, scanning is prohibited in the image forming apparatus 101 in the speed license unregistered state.

Figure 16:
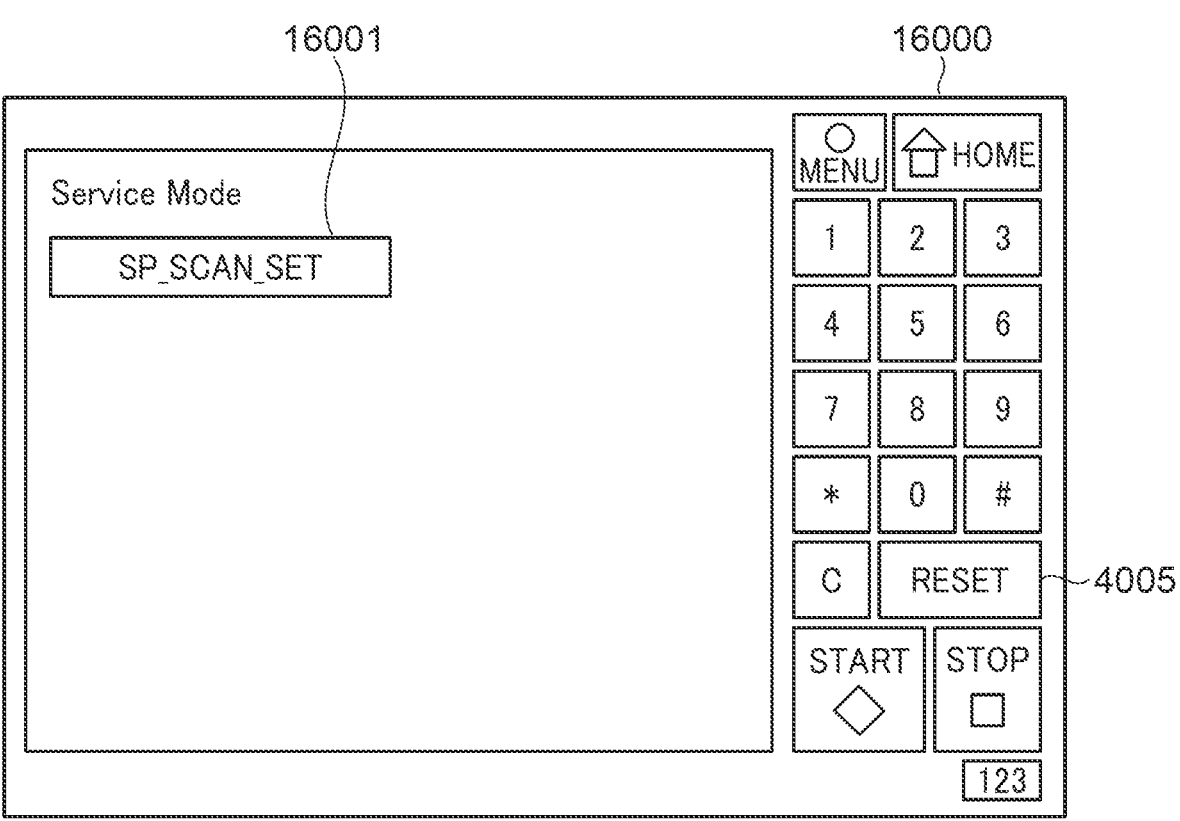
FIG. 16 is a view illustrating an example of a service mode screen according to a third embodiment.
Figure 17:
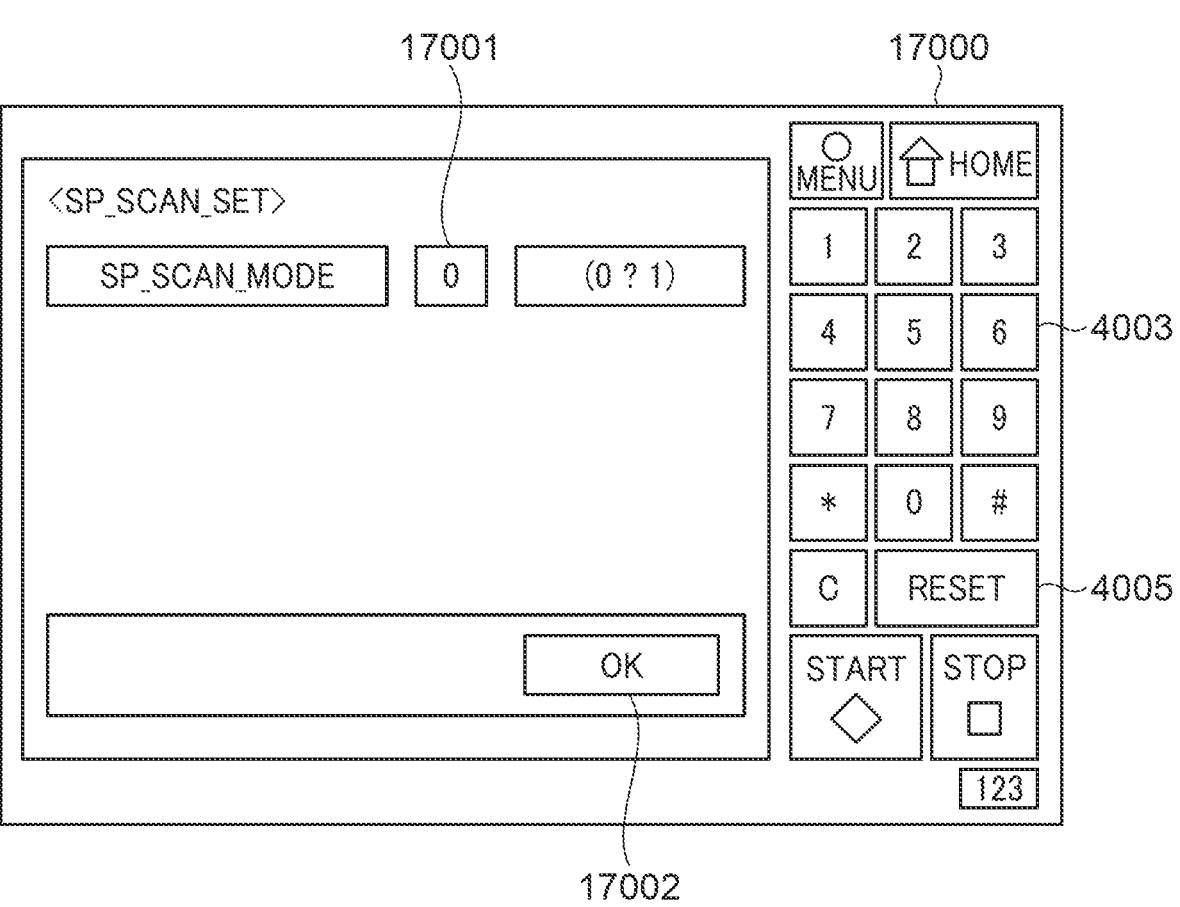
FIG. 17 is a view illustrating an example of a special scan mode setting screen according to the third embodiment.
Figure 18:
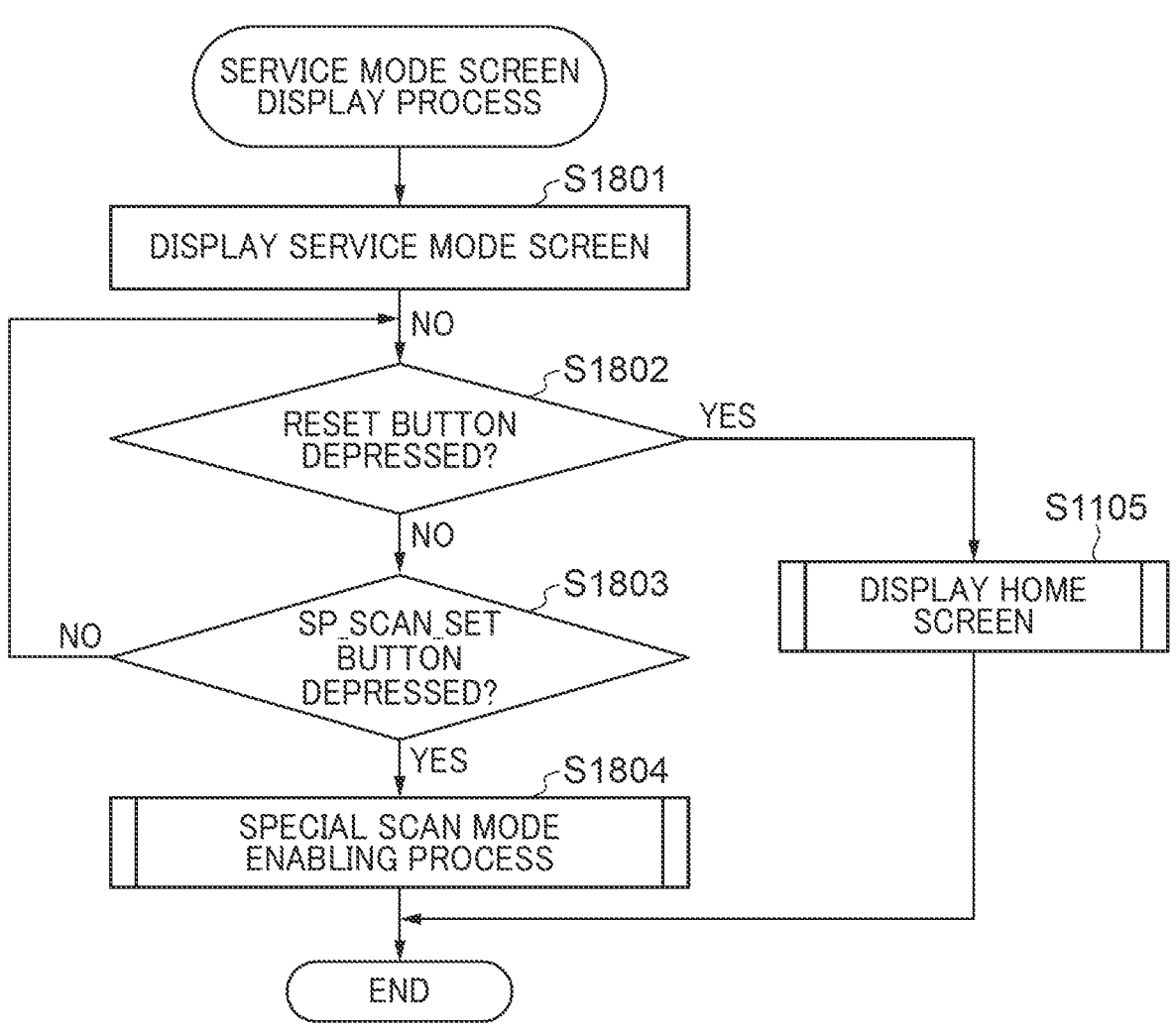
FIG. 18 is a flowchart illustrating a process relating to displaying the service mode screen according to the third embodiment.
Figure 19:
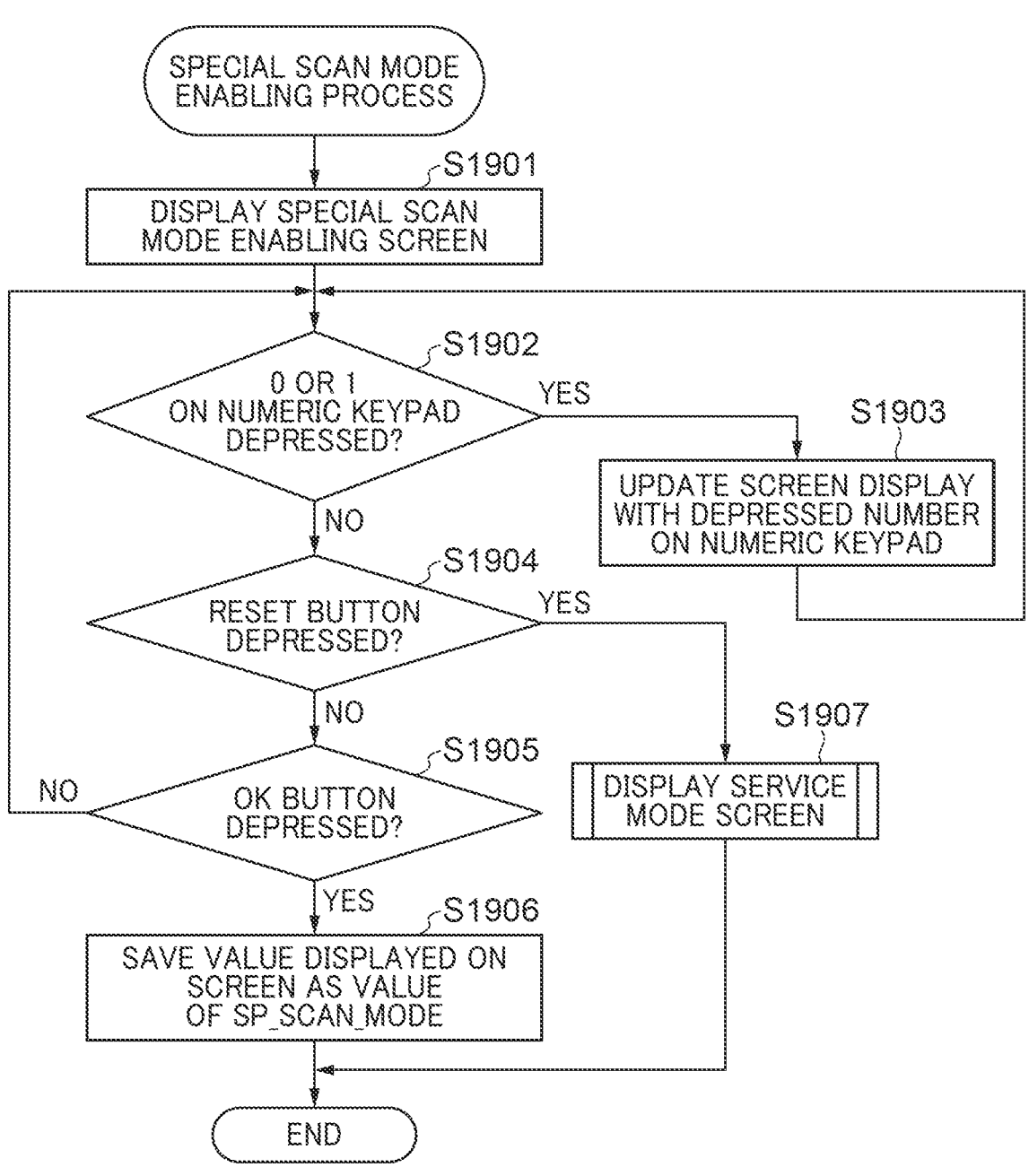
FIG. 19 is a flowchart illustrating a special scan mode setting process according to the third embodiment.
Figure 20:
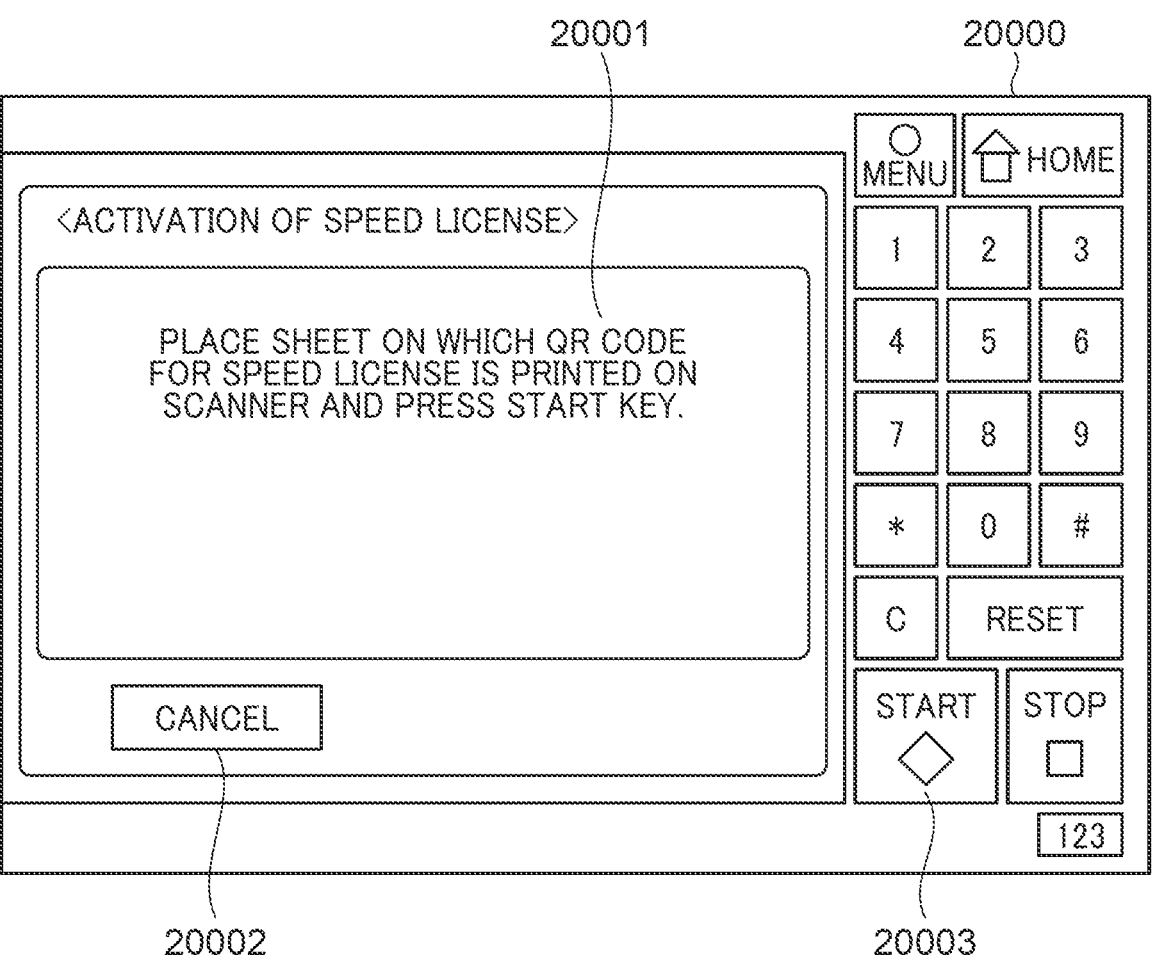
FIG. 20 is a view illustrating an example of a speed license registration screen according to the third embodiment.
Figure 21:
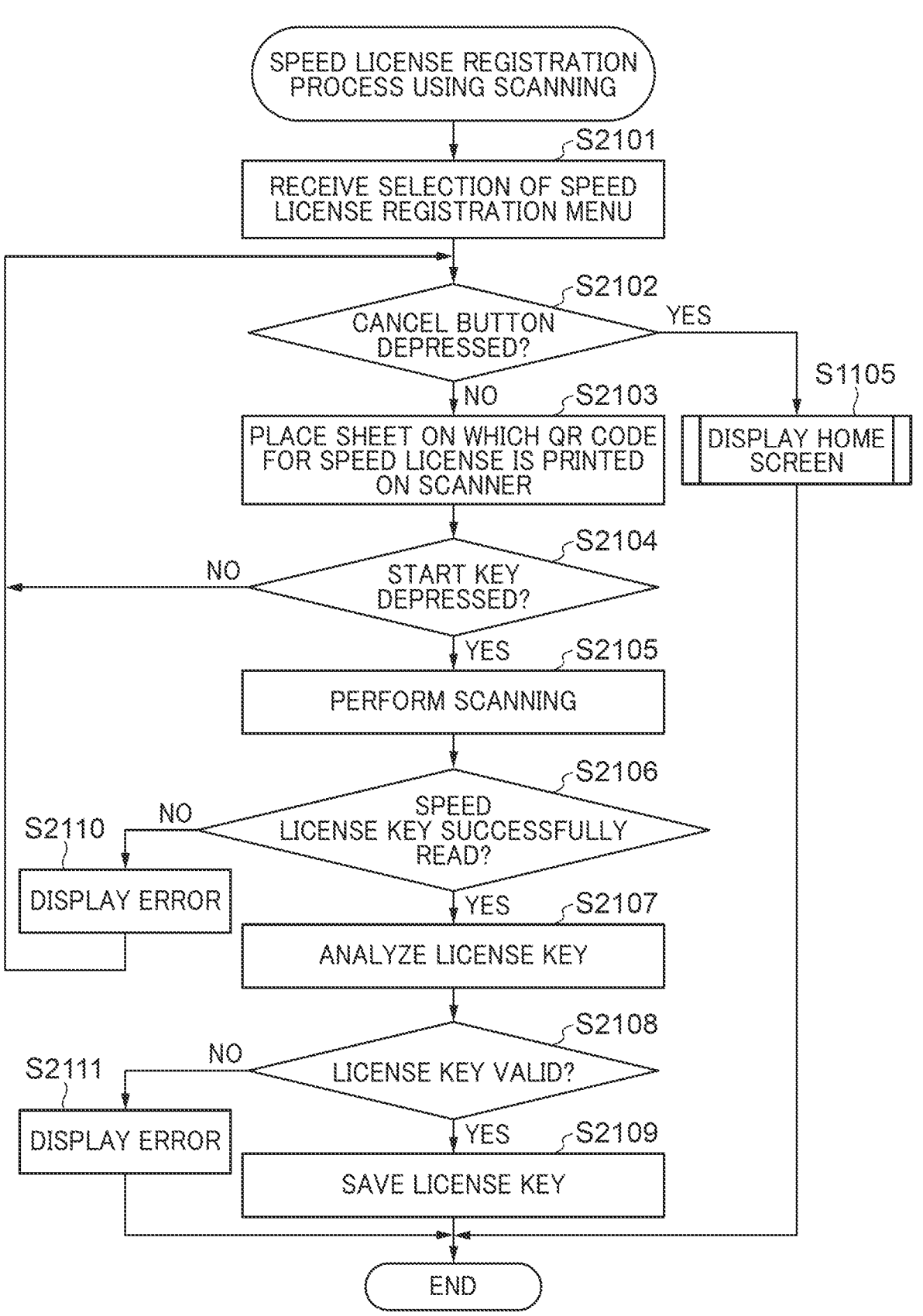
FIG. 21 is a flowchart illustrating a speed license registration process according to the third embodiment.
Figure 22:
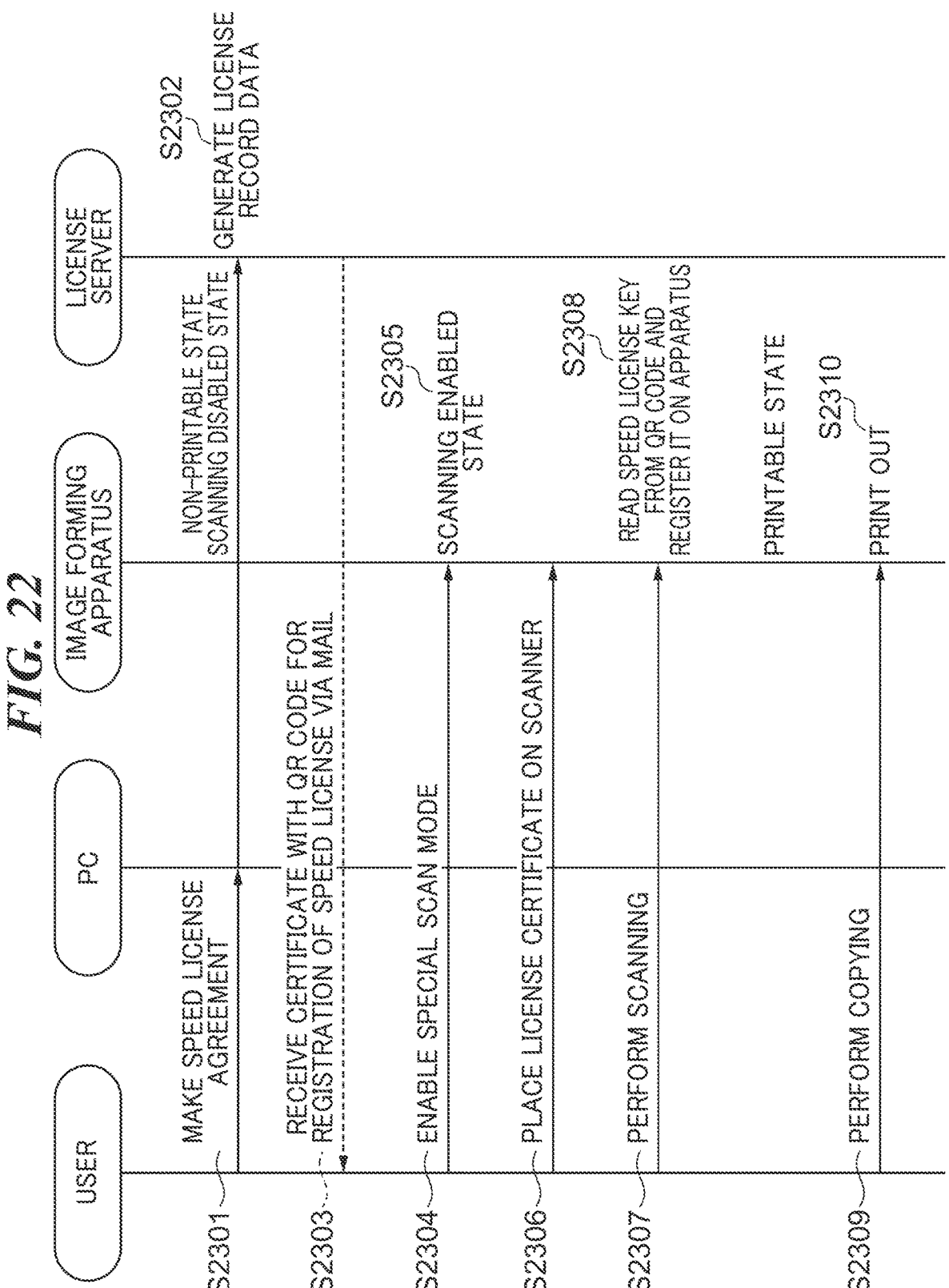
FIG. 22 is a sequence diagram illustrating how processing is performed among a user, a PC (personal computer), the image forming apparatus, and the license server.

FIG. 16 is a view illustrating an example of a service mode screen according to the third embodiment. FIG. 17 is a view illustrating an example of a special scan mode setting screen according to the third embodiment. FIG. 18 is a flowchart illustrating a process relating to displaying the service mode screen (service mode screen display process) according to the third embodiment. FIG. 19 is a flowchart illustrating a special scan mode setting process according to the third embodiment. FIG. 20 is a view illustrating an example of a speed license registration screen according to the third embodiment. FIG. 21 is a flowchart illustrating a speed license registration process according to the third embodiment. FIG. 22 is a sequence diagram illustrating how processing is performed among a user, a PC (personal computer), the image forming apparatus, and the license server. Control programs based on the flowcharts of FIG. 18, FIG. 19, and FIG. 21 are executed by the CPU 107.
Registration of Speed License Using Scanning Function A description will now be given of how a speed license is registered using the scanning function of the image forming apparatus 101. In the speed license unregistered state, the CPU 107 (the controller unit 102) prohibits the use of the printer unit 105 and also prohibits the reception of a reading instruction that instructs the scanner unit 106 to read a document. Initially, the image forming apparatus 101 is in the speed license unregistered state and in the non-printable state, and accordingly, the use of the scanning function is prohibited so that neither copying nor printing can be performed in the image forming apparatus 101. As illustrated in FIG. 22, in step S2301, a user makes a speed license agreement with a licensor via a website or the like using the PC. After the user makes the speed license agreement, license record data including the device serial ID 202, the license type ID 203, and the license key 204 is generated on the license server 201 in step S2302.

In step S2303, the user receives a speed license certificate via mail or the like. The speed license certificate is a document on which a two-dimensional barcode such as a QR code for registering a speed license key for the image forming apparatus 101 is printed.

In step S2304, the user enables a special scan mode, which will be described later, so as to scan (read) the speed license certificate with the scanner unit 106 of the image forming apparatus 101. After the special scan mode is enabled, the image forming apparatus 101 enters a scanning enabled state where scanning is permitted in step S2305.

In the scanning enabled state, the user opens the license registration screen on the image forming apparatus 101 and places the speed license certificate on the scanner unit 106 in step S2306. In step S2307, the user instructs the image forming apparatus 101 to scan the speed license certificate. As a result, in step S2308, the scanner unit 106 reads the QR code to register the license key on the image forming apparatus, putting the image forming apparatus 101 in the printable state where printing is permitted. Then, in step S2309, the user instructs the image forming apparatus 101 to performs copying. As a result, in step S2310, the image forming apparatus 101 produces a printout (performs printing) of the copied document.

Referring to FIG. 18 and FIG. 19, a description will now be given of how a mode in which scanning is exceptionally permitted is set. As illustrated in FIG. 18, in step S1801, the CPU 107 controls the display unit 103 to display a service mode screen 16000 (see FIG. 16). The service mode screen 16000 includes an SP_SCAN_SET button 16001 and the reset button 4005.

In step S1802, the CPU 107 determines whether or not the depression of the reset button 4005 in the service mode screen 16000 has been detected. As a result of the determination in the step S1802, when it is determined that the depression of the reset button 4005 has been detected, the process proceeds to the step S1105. In the step S1105, the CPU 107 carries out the home screen display process. On the other hand, as a result of the determination in the step S1802, when it is determined that the depression of the reset button 4005 has not been detected, the process proceeds to step S1803.

In the step S1803, the CPU 107 determines whether or not the depression of the SP_SCAN_SET button 16001 in the service mode screen 16000 has been detected. As a result of the determination in the step S1803, when it is determined that the depression of the SP_SCAN_SET button 16001 has been detected, the process proceeds to step S1804. On the other hand, as a result of the determination in the step S1803, when it is determined that the depression of the SP_SCAN_ SET button 16001 has not been detected, the process returns to the step S1802, and the step S1802 and the subsequent steps are sequentially executed.

In the step S1804, the CPU 107 carries out a special scan mode enabling process.

A description will now be given of the process in the step S1804 with reference to FIG. 19. As illustrated in FIG. 19, in step S1901, the CPU 107 controls the display unit 103 to display a special scan mode setting screen 17000 (see FIG. 17). The special scan mode setting screen 17000 includes the numeric keypad 4003, the reset button 4005, an SP_SCAN_ MODE value 17001, and an OK button 17002.

In step S1902, the CPU 107 determines whether or not the depression of "0" or "1" on the numeric keypad 4003 in the special scan mode setting screen 17000 has been detected. As a result of the determination in the step S1902, when it is determined that the depression of "0" or "1" has been detected, the process proceeds to step S1903. On the other hand, as a result of the determination in the step S1902, when it is determined that the depression of "0" or "1" has not been detected, the process proceeds to step S1904.

In the step S1903, the CPU 107 updates the SP_SCAN_ MODE value 17001 on the special scan mode setting screen 17000 with the value on the numeric keypad 4003 depressed in the step S1902.

In the step S1904, the CPU 107 determines whether or not the depression of the reset button 4005 in the special scan mode setting screen 17000 has been detected. As a result of the determination in the step S1904, when it is determined that the depression of the reset button 4005 has been detected, the process proceeds to step S1907. As a result of the determination in the step S1904, when it is determined that the depression of the reset button 4005 has not been detected, the process proceeds to step S1905.

In the step S1905, the CPU 107 determines whether or not the depression of the OK button 17002 in the special scan mode setting screen 17000 has been detected. As a result of the determination in the step S1905, when it is determined that the depression of the OK button 17002 has been detected, the process proceeds to step S1906. On the other hand, as a result of the determination in the step S1905, when it is determined that the depression of the OK button 17002 has not been detected, the process returns to the step S1902, and the step S1902 and the subsequent steps are sequentially executed.

In the step S1906, the CPU 107 updates the value of SP_SCAN_MODE stored in the RAM 109 with the value indicated as the SP_SCAN_MODE value 17001 and ends the special scan mode enabling process.

In the step S1907 after the execution of the step S1904, a service mode display process (see FIG. 18) is carried out.

A description will now be given of a speed license registration process using scanning with reference to FIG. 21. As illustrated in FIG. 21, in step S2101, the CPU 107 controls the display unit 103 to display a speed license activation screen 20000 (see FIG. 20). The speed license activation screen 20000 is a screen for speed license activation, and via the speed license activation screen 20000, the CPU 107 receives a reading instruction that instructs the scanner unit 106 to read a sheet on which a QR code for a speed license is printed. The speed license activation screen 20000 indicates, in a display area 20001, a message saying that "Place a sheet on which a QR code for a speed license is printed on the scanner" for a user.

In step S2102, the CPU 107 determines whether or not the depression of a cancel button 20002 in the speed license activation screen 20000 has been detected. As a result of the determination in the step S2102, when it is determined that the depression of the cancel button 20002 has been detected, the process proceeds to the step S1105. In the step S1105, the CPU 107 carries out the home screen display process. On the other hand, as a result of the determination in the step S2102, when it is determined that the depression of the cancel button 20002 has not been detected, the process proceeds to step S2103.

In the step S2103, the CPU 107 activates a start key 20003 in the speed license activation screen 20000 so as to enable the depression of the start key 20003 when a sheet on which the QR code is printed has been placed on the scanner unit 106.

In step S2104, the CPU 107 determines whether or not the depression of the start key 20003 has been detected. As a result of the determination in the step S2104, when it is determined that the depression of the start key 20003 has been detected, the process proceeds to step S2105. On the other hand, as a result of the determination in the step S2104, when it is determined that the depression of the start key 20003 has not been detected, the process returns to the step S2102, and the step S2102 and the subsequent steps are sequentially executed.

In the step S2105, the CPU 107 controls the scanner unit 106 to scan the sheet which is placed on the scanner unit 106 and on which the QR code is printed. As a result, the CPU 107 analyzes the QR code from image data read by scanning and read out information on the license key.

In step S2106, the CPU 107 determines whether or not the license key was successfully read in the step S2105. As a result of the determination in the step S2106, when it is determined that the license key has been successfully read, the process proceeds to step S2107. On the other hand, when it is determined that the license key was not successfully read, the process proceeds to step S2110.

In the step S2107, the CPU 107 analyzes the license key read in the step S2105.

In step S2108, the CPU 107 determines whether or not the result of the analysis in the step S2107 is a license key corresponding to the serial number of the image forming apparatus 101 stored in the EEPROM 111 and is valid. As a result of the determination in the step S2108, when it is determined that the license key is valid, the process proceeds to step S2109. On the other hand, as a result of the determination in the step S2108, when it is determined that the license key is not valid, the process proceeds to step S2111.

In the step S2109, the CPU 107 stores the value of the license key in the RAM 109.

In the step S2111, the CPU 107 controls the display unit 103 to display an error and ends the speed license registration process.

In the step S2110 after the execution of the step S2106, the CPU 107 controls the display unit 103 to display an error. The process then returns to the step S2102, and the step S2102 and the subsequent steps are sequentially executed.

As described above, in license authentication for the image forming apparatus 101, there may be cases where an operation restriction (restriction of scanner operation) or a function restriction (prohibition of the use of the scanning function) is enforced in the image forming apparatus 101. That is, there may be cases where, while the image forming apparatus 101 is in the speed license unregistered state, the use of the printer unit 105 is prohibited, and the reception of a document reading instruction that instructs the scanner unit 106 to read a document is prohibited under the control of the CPU 107. In those cases, in the image forming apparatus 101, temporary reading of a documents including license information (QR code) by the scanner unit 106 is permitted under the control of the CPU 107, where the license information is information which puts the image forming apparatus 101 in a license state different from the speed license unregistered state. Here, "temporarily reading" means performing a reading operation a number of times determined in advance or performing a reading operation within a period of time determined in advance. The use of the printer unit 105 is also permitted under the control of the CPU 107. The display unit 103 displays the second screen (the special scan mode setting screen 17000) for license authentication in which the document reading and the use of the printer unit 105 are permitted. The display unit 103 also displays the speed license activation screen 20000 that receives a reading instruction, which instructs the scanner unit 106 to read a document including license information. With this configuration, the restricted operation or function is temporarily permitted in the image forming apparatus 101 so that a license can be authenticated, that is, a speed license can be registered.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, control in the image forming apparatus 101 may be executed by either one controller unit (controller) or a plurality of controller units (controllers).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium.

The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2022-128967 filed on Aug. 12, 2022 which is hereby incorporated by reference wherein in its entirety.

What is claimed is:

1. An image forming apparatus comprising:
   a display unit that displays a screen;
   an image forming unit that performs image formation on a sheet;
   at least one processor that controls the display unit and the image forming unit based on an operational state of the image forming apparatus; and
   a memory including instructions that, when executed by the at least one processor, cause the at least one processor to:
   control the display unit to display a first screen comprising a first network setting menu item, wherein the first network setting menu item receives user input to set up a network available for use in receiving image data for the image formation;
   while the image forming apparatus is in a non-printable state where a license that determines a speed of image formation by the image forming unit has not been registered on the image forming apparatus, prohibit use of the image forming unit and prohibit selection of the first network setting menu item on the first screen;
   control the display unit, in the non-printable state, to display an operation screen including a plurality of key buttons that receives user input of a special key operation, enabling a setting mode,
     wherein the special key operation comprises at least two of the plurality of key buttons being depressed a predetermined number of times and in a predetermined order;
   in response to the enabling of the setting mode, control the display unit, in the non-printable state, to display a second screen comprising a second network setting menu, wherein the second network setting menu receives user input to set up the network available for use in registration of the license on the image forming apparatus that determines the speed of image formation by the image forming unit, the use of the image forming unit apparatus being permitted in the registration of the license; and
   perform the registration of the license on the image forming apparatus using the network available for use,
   wherein after the registration of the license is completed, the image forming unit performs image formation at the speed determined by the license.

2. The image forming apparatus according to claim 1, wherein the instructions cause the at least one processor to control the display unit, in the non-printable state, to sequentially display a plurality of types of the second screen according to a user's operation on the display unit.

* * * * *